US008763555B2

(12) United States Patent
Kurtz

(10) Patent No.: US 8,763,555 B2
(45) Date of Patent: Jul. 1, 2014

(54) ANIMAL FEEDER

(76) Inventor: William C. Kurtz, St. Croix Falls, WI (US)

( * ) Notice: Subject to any disclaimer, the term of this patent is extended or adjusted under 35 U.S.C. 154(b) by 1394 days.

(21) Appl. No.: 12/991,089

(22) PCT Filed: Jan. 3, 2008

(86) PCT No.: PCT/US2008/000134
§ 371 (c)(1),
(2), (4) Date: Nov. 4, 2010

(87) PCT Pub. No.: WO2008/085899
PCT Pub. Date: Jul. 17, 2008

(65) Prior Publication Data
US 2011/0253053 A1    Oct. 20, 2011

Related U.S. Application Data

(60) Provisional application No. 60/878,233, filed on Jan. 3, 2007.

(51) Int. Cl.
*A01K 1/10* (2006.01)
(52) U.S. Cl.
USPC ............................................. 119/58; 119/60
(58) Field of Classification Search
USPC ...................................... 119/58, 60
See application file for complete search history.

(56) References Cited

U.S. PATENT DOCUMENTS

| 5,092,273 | A  | * | 3/1992 | Meyer | ......................... | 119/52.4 |
| 6,213,053 | B1 | * | 4/2001 | Lammers | .................. | 119/51.01 |
| 7,418,924 | B2 | * | 9/2008 | Klene | ............................. | 119/60 |

* cited by examiner

*Primary Examiner* — Kristen C Hayes
(74) *Attorney, Agent, or Firm* — Meister Seelig & Fein LLP

(57) ABSTRACT

Devices for providing feed to farm animals, particularly large farm animals are disclosed. In the invention, an enclosure for the feed is provided. In one embodiment of the invention the feed rests directly on the ground. In another embodiment of the invention, the feed is placed on a rack or grate a distance above the ground. The feed is surrounded by a fence that denies access to the feed except as will be described hereafter. At least one pivoting access grate is moved into contact with the feed to prevent the feed from being blown around by the wind or scattered by the animals and also to limit access to the feed. The access grate is a series of bars that are preferably spaced at desirable distances to provide optimal access to the feed by the animals. In one embodiment of the invention, this access grate may be limited in movement to control the amount of feed that an animal or animals is allowed to eat during a given time. In one embodiment of the invention, the feeder is covered to protect the feed from undesirable effects from the weather.

20 Claims, 19 Drawing Sheets

ANIMAL FEEDER

BACKGROUND OF THE INVENTION

1. Field of the Invention

This invention relates to devices for feeding animals particularly large farm animals.

2. Description of Related Art

Processes and systems for feeding farm animals have evolved over the years. Today, a common way to feed large farm animals is to provide to the animals hay that has been baled. This is often done by providing an enclosed feeder where the hay is placed on the ground within the feeder. A short fence separates the animals from the feed. The animals stand on one side of the fence and reach over the fence to eat the feed.

There are several problems with such feeders. First, because the feed is placed on the ground, the feed, especially the feed near the ground, can be mixed with the dirt and sand on the ground. When the animals ingest the feed that has been contaminated with dirt or sand, the dirt or sand causes digestive problems for the animals.

Further, there is no control over how much feed an animal can eat from such feeders. It is not uncommon for animals to "pig out" and overeat. This causes founder in some horses.

In addition, animals using such feeders have a tendency to scatter the feed. This means that while eating, the animal scatters feed onto the ground where it may be contaminated with dirt or sand as described above or may become unattractive to the animal who will then refuse to eat such scattered feed. As a result, the feed becomes waste.

Finally, many feeders are not covered. As a result, the feed is subject to the elements such as rain and snow. This causes the feed to become wet which is often unattractive to the animals. In addition, the wet feed often provides ideal growing conditions for fungus and mildew which makes the feed at best unattractive to the animals and at worst presents a health hazard to the animals.

In view of the foregoing described problems with traditional feeders, there is a need for a feeder for farm animals that avoids or minimizes the problems described above.

SUMMARY OF THE INVENTION

Devices for providing feed to farm animals, particularly large farm animals are disclosed. In the invention, an enclosure for the feed is provided. In one embodiment of the invention the feed rests directly on the ground. In another embodiment of the invention, the feed is placed on a rack or grate a distance above the ground. The feed is surrounded by a fence that denies access to the feed except as will be described hereafter. At least one pivoting access grate is moved into contact with the feed to prevent the feed from being blown around by the wind or scattered by the animals and also to limit access to the feed. The access grate is a series of bars that are preferably spaced at desirable distances to provide optimal access to the feed by the animals. In one embodiment of the invention, this access grate may be limited in movement to control the amount of feed that an animal or animals is allowed to eat during a given time. In one embodiment of the invention, the feeder is covered to protect the feed from undesirable effects from the weather.

It is therefore an object of the present invention in one or more embodiments to provide devices that provide feed to animals, particularly farm animals, and more particularly large farm animals.

It is an object of the present invention in one or more embodiments to provide devices that limit the amount of feed that an animal or animals may eat during a particular time.

It is an object of the present invention in one or more embodiments to provide devices that prevent the feed from being blown around by the wind or scattered by the animals.

It is a further object of the invention in one or more embodiments to provide devices that shelter the feed from undesirable contact with the elements.

Not all of these objects need be present in a single embodiment. Instead, a particular embodiment may have one or more of these objects. These and other objects of the invention will be clear from the following detailed description of the invention in connection with the drawings

BRIEF DESCRIPTION OF THE DRAWINGS

The invention will be described hereafter in detail with particular reference to the drawings. Throughout this description, like elements, in whatever embodiment described, refer to common elements wherever referred to and referenced by the same reference number. The characteristics, attributes, functions, interrelations ascribed to a particular element in one location apply to that element when referred to by the same reference number in another location unless specifically stated otherwise. In addition, the exact dimensions and dimensional proportions to conform to specific force, weight, strength and similar requirements will be within the skill of the art after the following description has been read and understood.

All Figures are drawn for ease of explanation of the basic teachings of the present invention only; the extensions of the Figures with respect to number, position, relationship, and dimensions of the parts to form examples of the various embodiments will be explained or will be within the skill of the art after the following description has been read and understood.

DETAILED DESCRIPTION OF THE INVENTION

Figure 1:
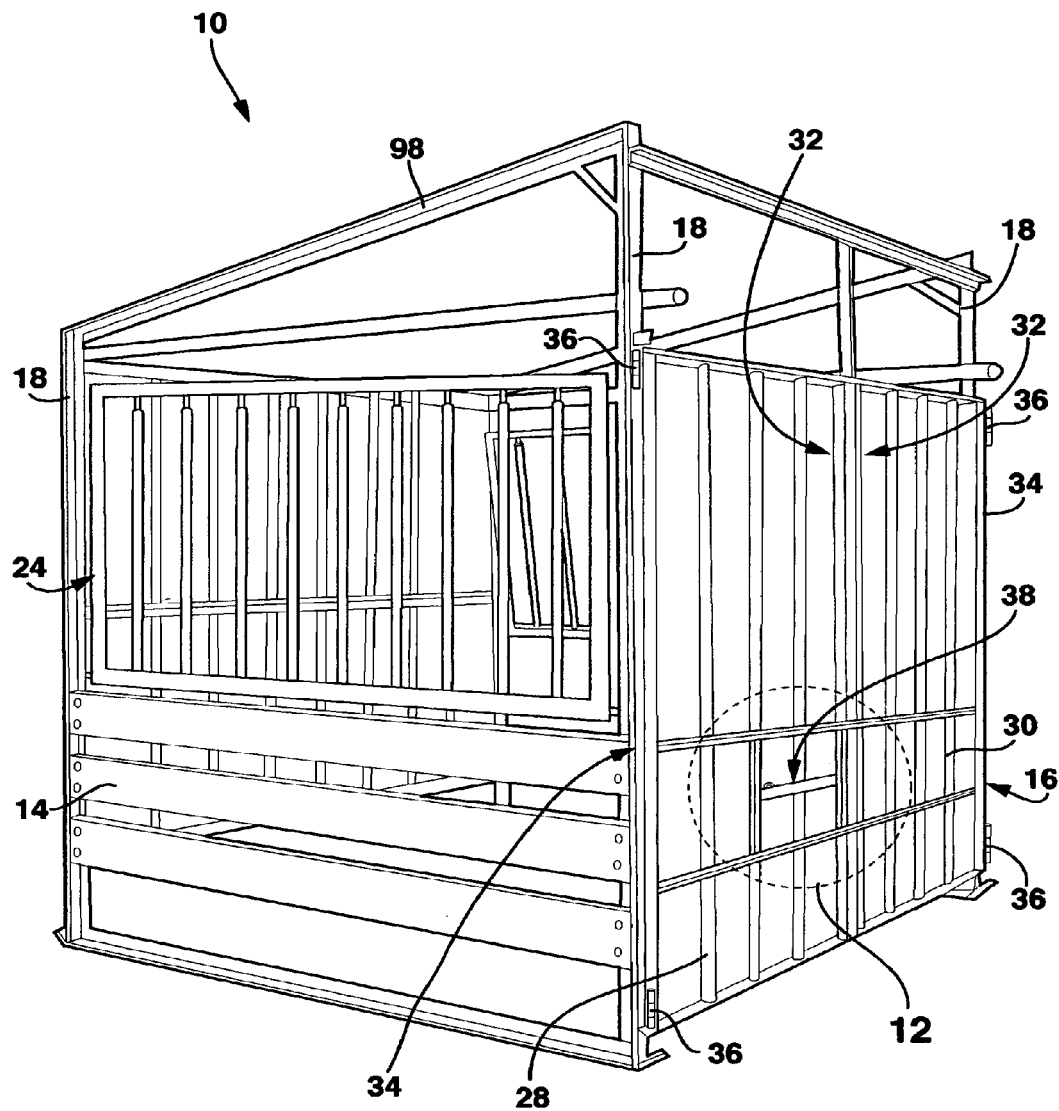
FIG. 1 is a perspective view of one embodiment of the feed device of the present invention.
Figure 2:
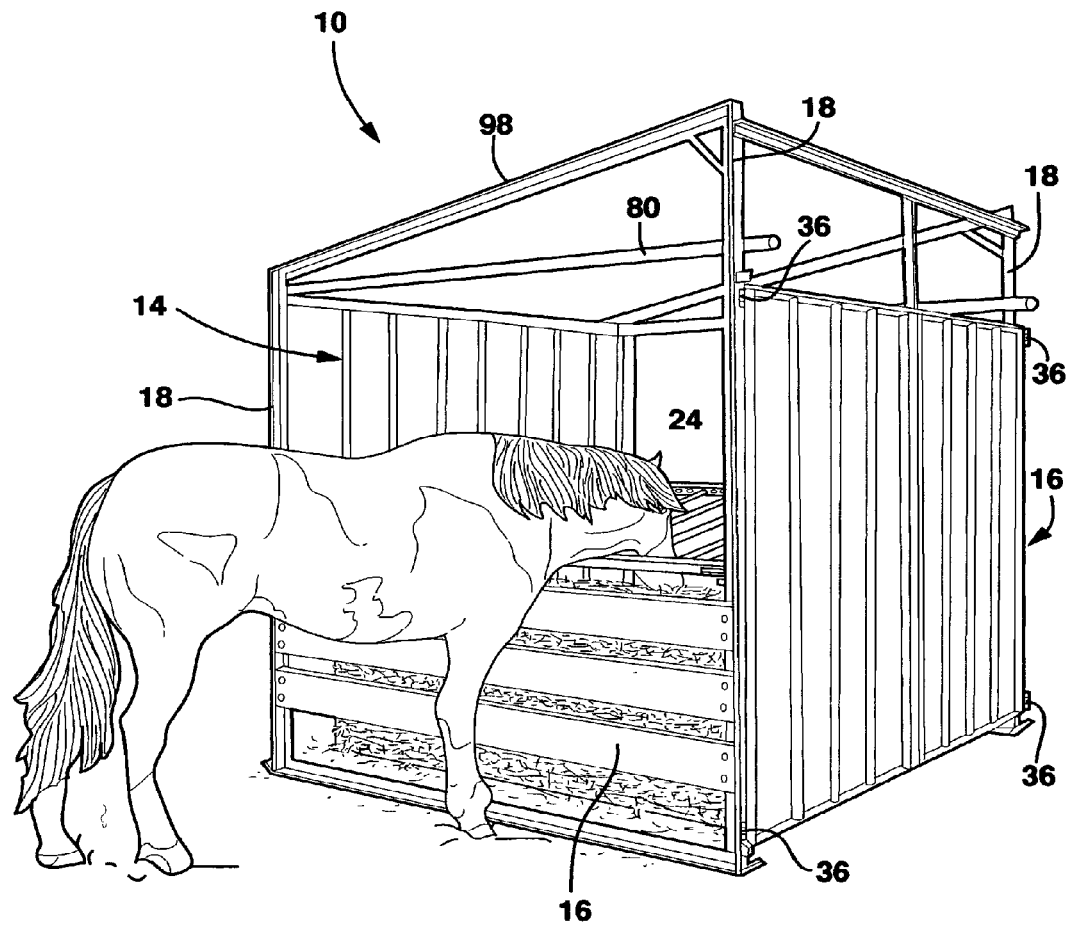
FIG. 2 is a perspective view of the embodiment of the feed device of FIG. 1 in use.
Figure 3:
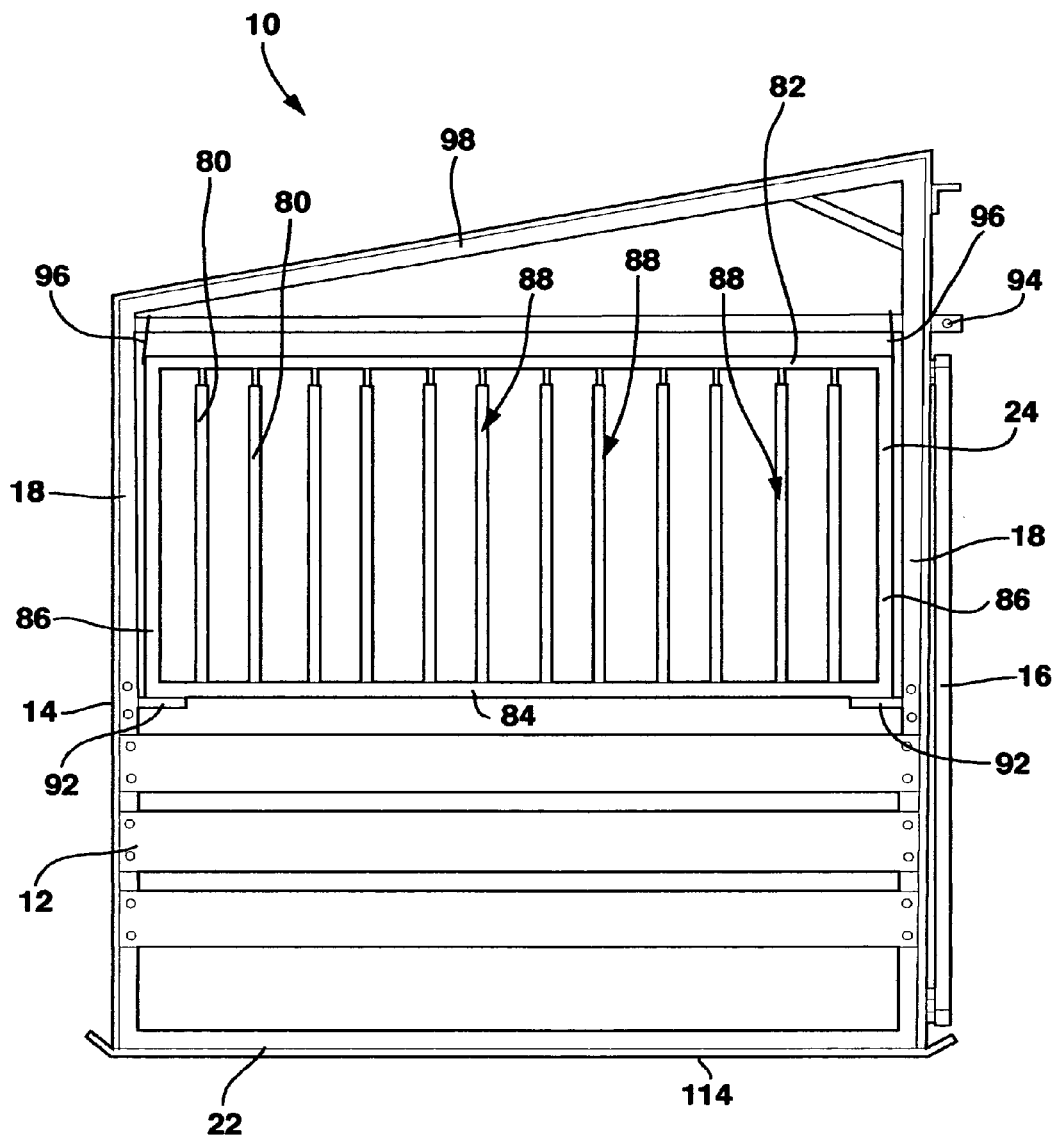
FIG. 3 is a side view of the feed device of FIG. 1.
Figure 4:
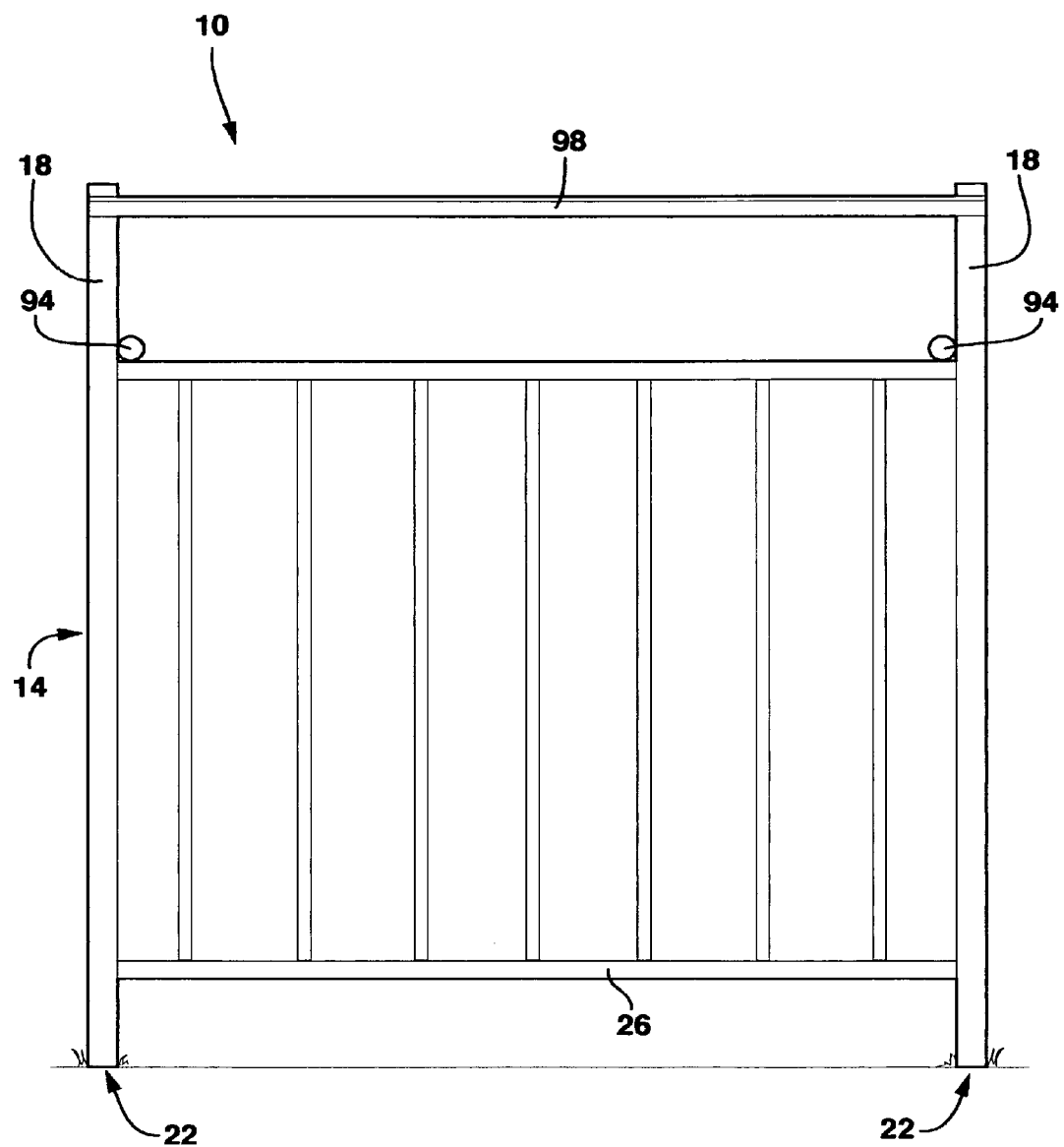
FIG. 4 is an end view of the feed device of FIG. 1 from the rigid end fence.

In order that the invention may be clearly understood and readily carried into effect, preferred embodiments of the invention will now be described, by way of example only and not to limit the invention, with reference to the accompanying drawings. The feed device of the present invention is shown in the drawings generally labeled 10.

The feed device 10, in an embodiment shown in FIGS. 1-9, includes a pair of opposed side fences 12, a rigid end fence 14 and a pivoting end fence 16. In the embodiment shown in FIGS. 1 through 9, the feed device 10 includes a corner post 18 located at each corner of the feed device 10. The rigid end fence 14 is connected to an opposed side fence 12 on each end of the rigid end fence 14 through a corner post 18. The pivoting end fence 16 connects the two opposed side fences 12 opposite the rigid end fence 14 through a pair of corner posts 18. As a result, an enclosure 20 is formed bounded by the opposed side fences 12 on opposite sides connected by the rigid end fence 14 and pivoting end fence 16 on opposite sides. The enclosure 20 contains feed for animals.

The opposed side fences 12 each have a bottom surface 22 and preferably have a height that allows the animal using the feed device 10 to comfortably reach over the opposed side fence 12 to have access to the feed in the enclosure through an access grate 24 as will be described hereafter.

Figure 7:
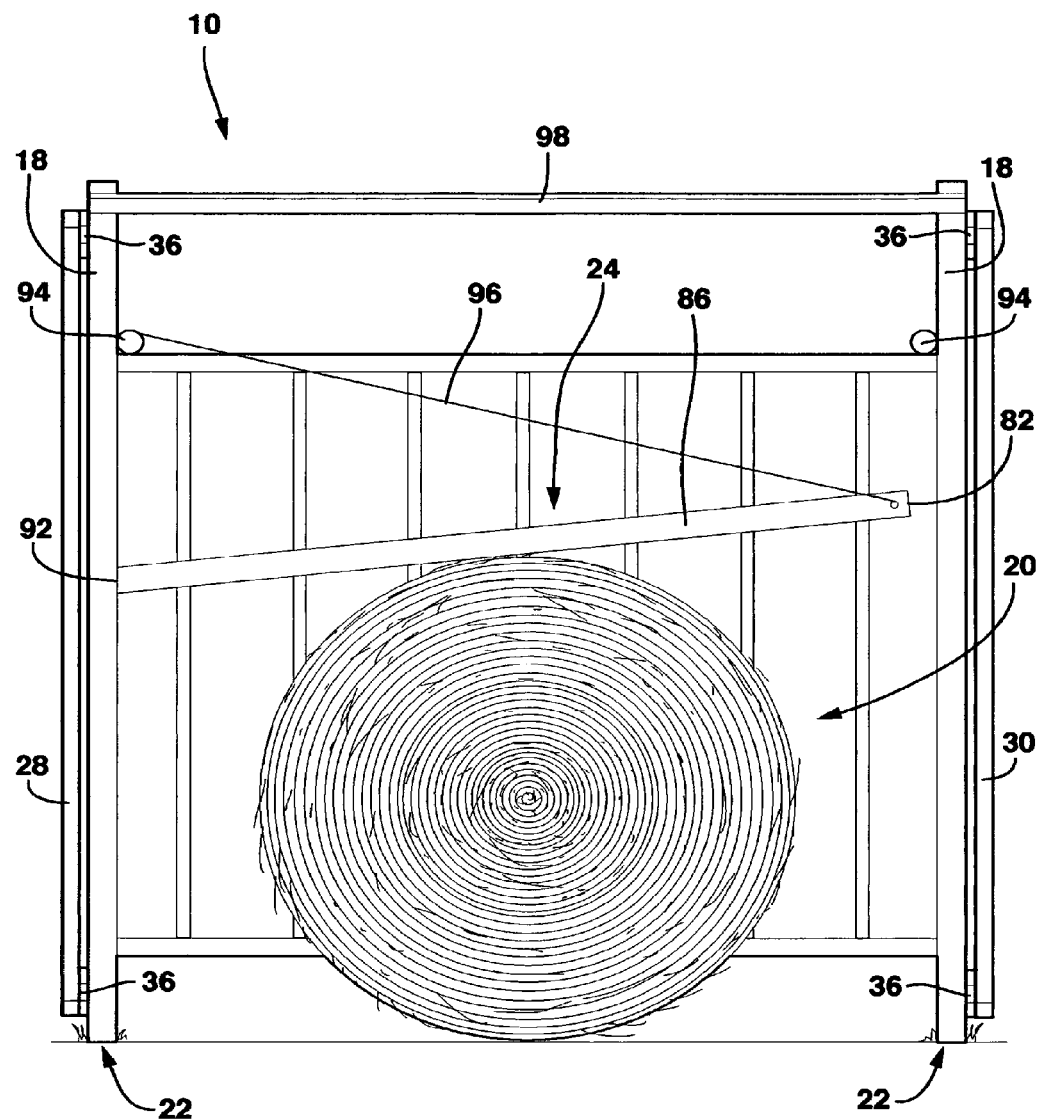
FIG. 7 is an end view of an alternate embodiment of the feed device with the end gate open and the access grate in contact with the feed.

In an embodiment of the feed device 10 shown in FIG. 7, feed is placed in the enclosure 20 directly on the ground. In another embodiment of the feed device 10 shown in FIG. 8, a bottom grate 26 extends between the two opposed side fences 12 to support the feed a distance above the ground. This bottom grate 26 preferably is a grate having spacing small enough to support the feed above the ground but not to allow significant portions of the feed to pass through the spacing in the grate to fall to the ground. In fact the bottom grate 26 may also be a solid piece that acts as a floor.

The pivoting end fence 16 is made up of two end sections 28, 30 that are pivotally connected to a respective corner post 18 on the ends of the opposed side fences 12. Each end section 28, 24 has an ultimate edge 32 and a pivoting edge 34. The pivoting connection of each end section 28, 24 to a respective corner post 18 is preferably accomplished by means of a hinge 36 so that each end section 28, 24 may freely move around the pivot point created by the hinge 36 to allow ultimate edges 32 of the end sections 28, 30 to be moved toward or away from the enclosure 20 to allow access to the enclosure 20. In particular, moving the end sections 28, 30 to an "open" position (where the ultimate edges 32 are relatively far apart from each other) allows feed to be moved into the enclosure 20 between the now open end sections 28, 30. When it is desired to close the end sections 28, 30, the end sections 28, 30 are pivoted around the hinge 36 into a closed configuration so that the ultimate edges 32 of the end sections 28, 30 are in near contact with each other.

Figure 9:
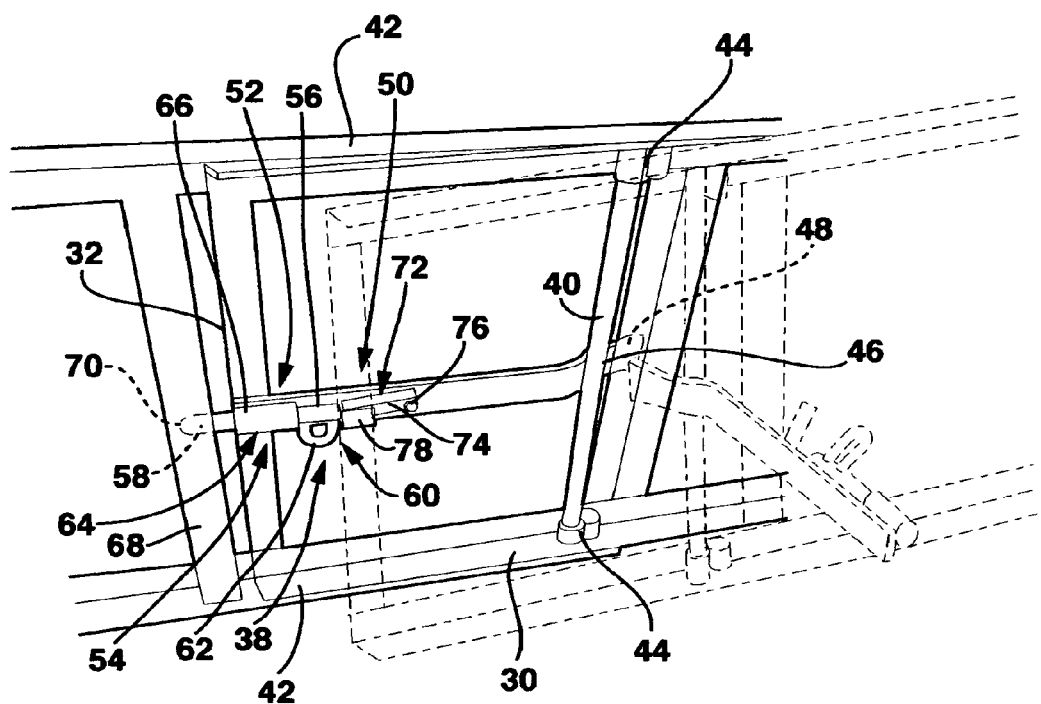
FIG. 9 is a perspective view of a handle for the end gate of the feed device of FIG. 1.
Figure 10:
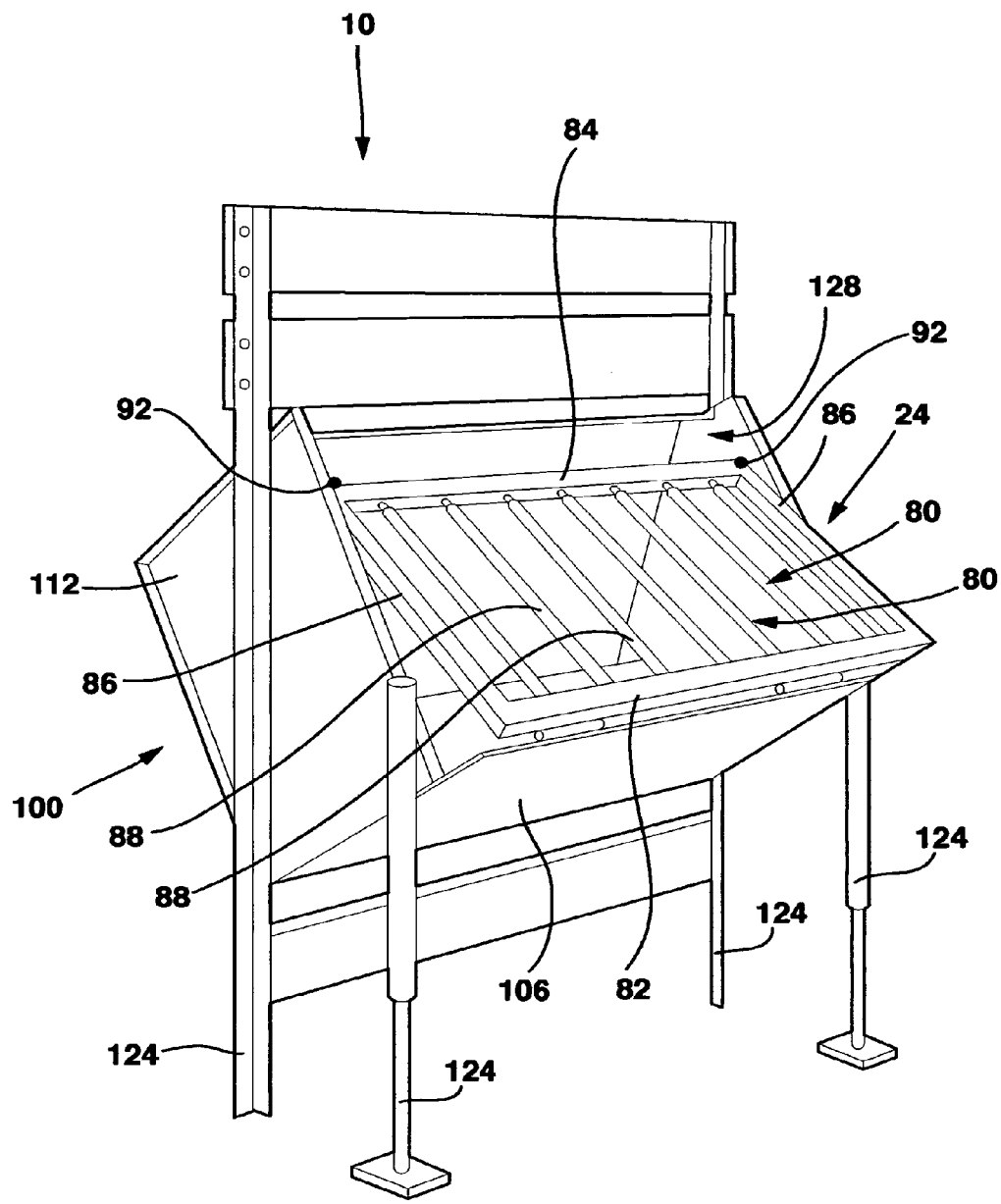
FIG. 10 is a perspective view of an alternate embodiment of the feed device.
Figure 11:
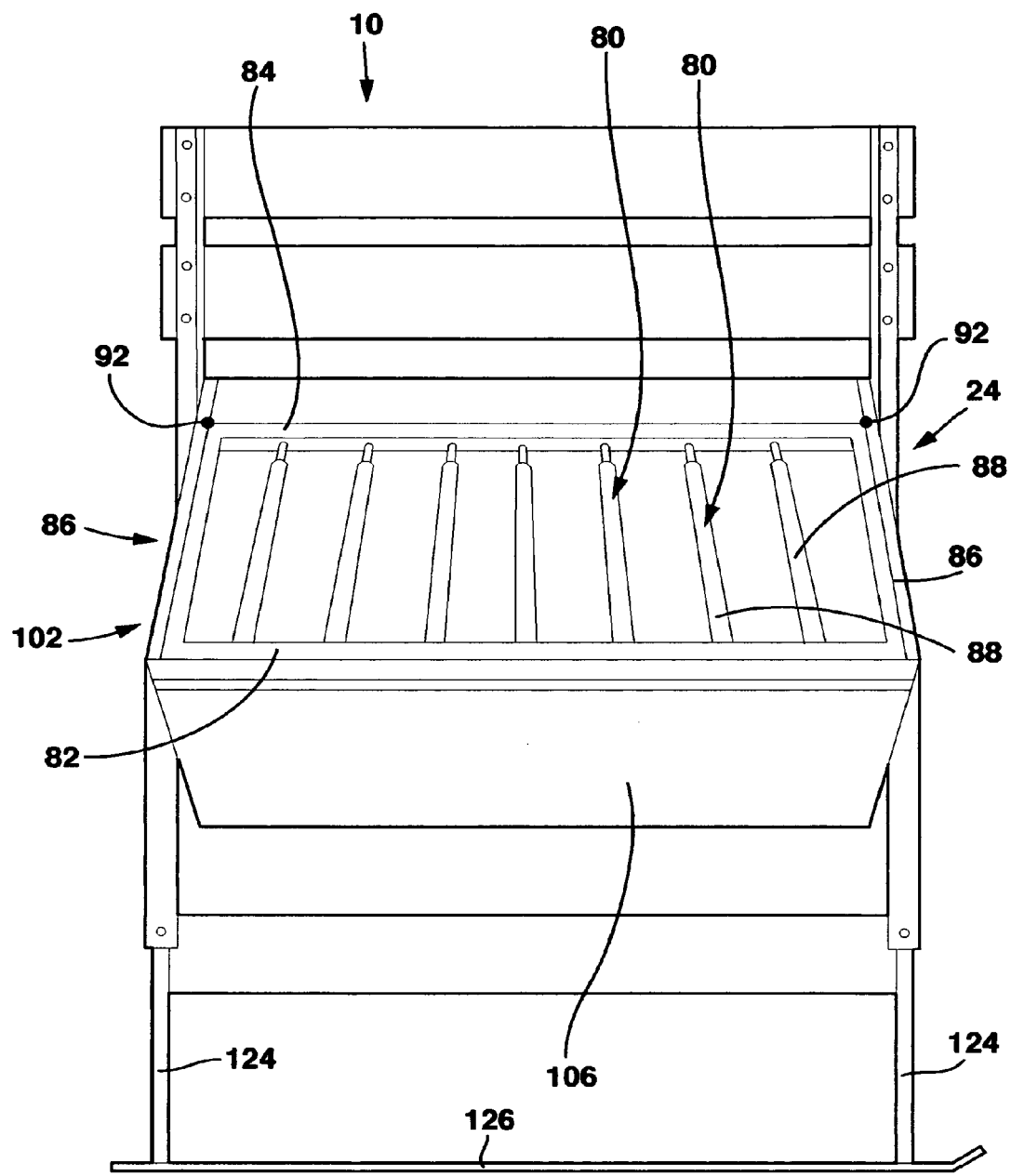
FIG. 11 is a side view of the feed device of FIG. 10.
Figure 12:
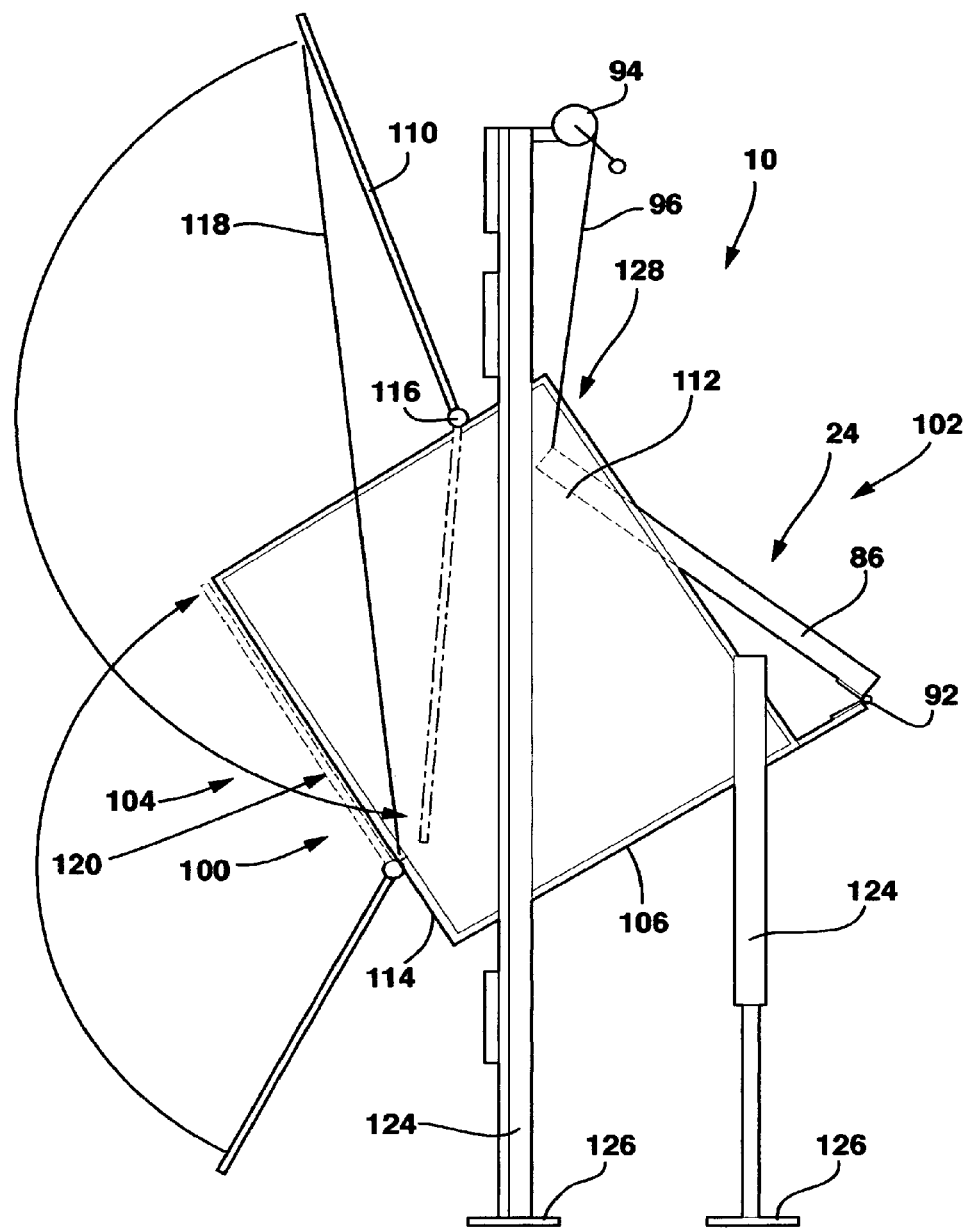
FIG. 12 is an end view of the feed device of FIG. 10.

A latch 38 locks the end sections 28, 30 together so that they form the closed pivoting end fence 16. The latch 38 may be one well understood in the art for closing gates or may be of the type shown in FIG. 9. The latch 38 in FIG. 9 is located near the ultimate edges 32 of the end sections 28, 30. Latch 38 has a pivoting bar 40 that extends substantially vertically near the ultimate edge 32 of either end section 28 or end section 30 between two parallel reinforcing strips 42 that run at least in part across the end sections 28, 30. The pivoting bar 40 connects to the reinforcing strips 42 through at least on and preferably a pair of hinges 44 that allow the pivoting bar 40 to rotate about its longitudinal axis. A tang 46 extends away from the pivoting bar 40 preferably about midway along the pivoting bar 40. The tang 46 may be slightly offset from the center of the pivoting bar 40 or may be slightly curved or both.

A tang slot 48 is formed in the ultimate edge 32 of the end section 28 (where the pivoting bar 40 is attached to the end section 30) or the ultimate edge 32 of the end section 30 (where the pivoting bar 40 is attached to the end section 38). The tang slot 48 is dimensioned to snugly receive the tang 46 as the ultimate edges 32 of the end sections 28, 30 are brought close together and the pivoting bar 40 rotated about its longitudinal axis as will be described hereafter.

A leverage bar 50 extends away from the pivoting bar 40 approximately opposite the tang 46. The function of the leverage bar 50 is to move the pivoting bar 40 about its longitudinal axis. The leverage bar 50 has an ultimate end 52 opposite the pivoting bar 40. At the ultimate end 52, the leverage bar 50 has a securing mechanism 54 that keeps the ultimate end 52 of the leverage bar 50 is a secure and locked relationship to either the end section 28 or end section 30 that the pivoting bar 40 and leverage bar 50 are attached.

The securing mechanism 54 has a bolt 56 having a connection end 58, an opposed handle end 60 with a handle 62 and a middle section 64 that extends between the connection end 58 and the handle end 60. The middle section 64 passes through a tube 66 that is attached to the leverage bar 50 near the ultimate end 52. A vertical bar 68 extends between the reinforcing strips 42 near where the ultimate end 52 of the leverage bar 50 is when the latch 38 is in its fully closed and latched position. The vertical bar 68 has a latch hole 70 formed in it opposite the ultimate end 52 of the leverage bar 50 dimensioned to snugly receive the connection end 58. When the leverage bar 50 is moved near the vertical bar 68, the bolt 56 is moved by grasping the handle 62 and moving the bolt 56 through the tube 66 so that the connection end 58 snugly engages and is retained in the latch hole 70.

The latch 38 also includes a lock 72. The lock 72 prevents the bolt 56 from being moved, for example by an animal such as a horse, so that the end sections 28, 30 can be opened to allow an animal unfettered access to the feed within the enclosure 20. The lock 72 has a bar 74 that pivots around a pivot pin 76 and a rest 78 located a small distance from where the handle end 60 of the bolt 56 will be when the connection end 58 is engaged with the latch hole 70. The bar 74 is moved into contact with the rest 78 and the handle end 60 when the bolt 56 has been moved into engagement with the latch hole 70 to prevent the bolt 56 from moving out of engagement with the latch hole 70. The latch 38 not only acts as a latch to securely close the end sections 28, 30 and prevent the opening of the end sections 28, 30 by an animal such as a horse, but the latch 38 also acts as a sort of sway bar to stabilize the pivoting end fence 16 when the end sections 28, 30 are closed.

In use, the ultimate edges 32 of the end sections 28, 30 are brought close together. The leverage bar 50 is moved to rotate the pivoting bar 40 so that engages the tang slot 48. The latch 38 closes by moving the leverage bar 50 near to the vertical bar 68 whereafter the leverage bar 50 is latched into a locked position by actuating the securing mechanism 54 as described above.

The pivoting end fence 16 has been described as being made of two pieces, namely end sections 28, 30. However, pivoting end fence 16 may also be made of a single section attached to a corner post 18 by one or more hinges 36 or may pivot around a horizontal axis.

Although the feed device 10 has been described as having an enclosure 20 formed essentially in the shape of a rectangle and more particularly in the shape of a square, the feed device 10 may have an enclosure 20 in any shape so long as at least one access grate 24 as will be described hereafter is able to be moved into contact with the feed as described hereafter. For example, and intended only to illustrate not limit the possible shapes of the enclosure 20, the enclosure 20 may take the form of any shape having at least one flat side such as a triangle, pentagon, hexagon, septagon, octagon or other regular geometric shape or other two-dimensional geometric figure having at least one flat side including a free form having at least one flat side.

Although the pivoting end fence 16 has been described above as having two end sections 28, 30, the pivoting end fence 16 may be made of a single end fence that pivots on a hinge 36 around a corner post 18 on one end of an opposed side fence 12. In another variant of the feed device 10, the pivoting end fence 16 may be a fence that moves vertically up and down between respective corner posts 18 attached to the ends of the opposed side fences 12. In this variant of the feed device 10, the pivoting end fence 16 is moved vertically upward to allow access to the enclosure 20 whereafter the pivoting end fence 16 is moved vertically downward to close access to the enclosure 20.

In a further variant of the feed device 10, the pivoting end fence 16 may pivot either along an axis parallel to and located close to the ground or an axis located parallel to and a distance above the ground. In this variant, the pivoting end fence 16 would pivot toward or away from the ground, respectively, to allow access to the enclosure 20 whereafter the pivoting end fence 16 would then pivot back into a substantially vertical orientation to close the enclosure 20.

Figure 6:
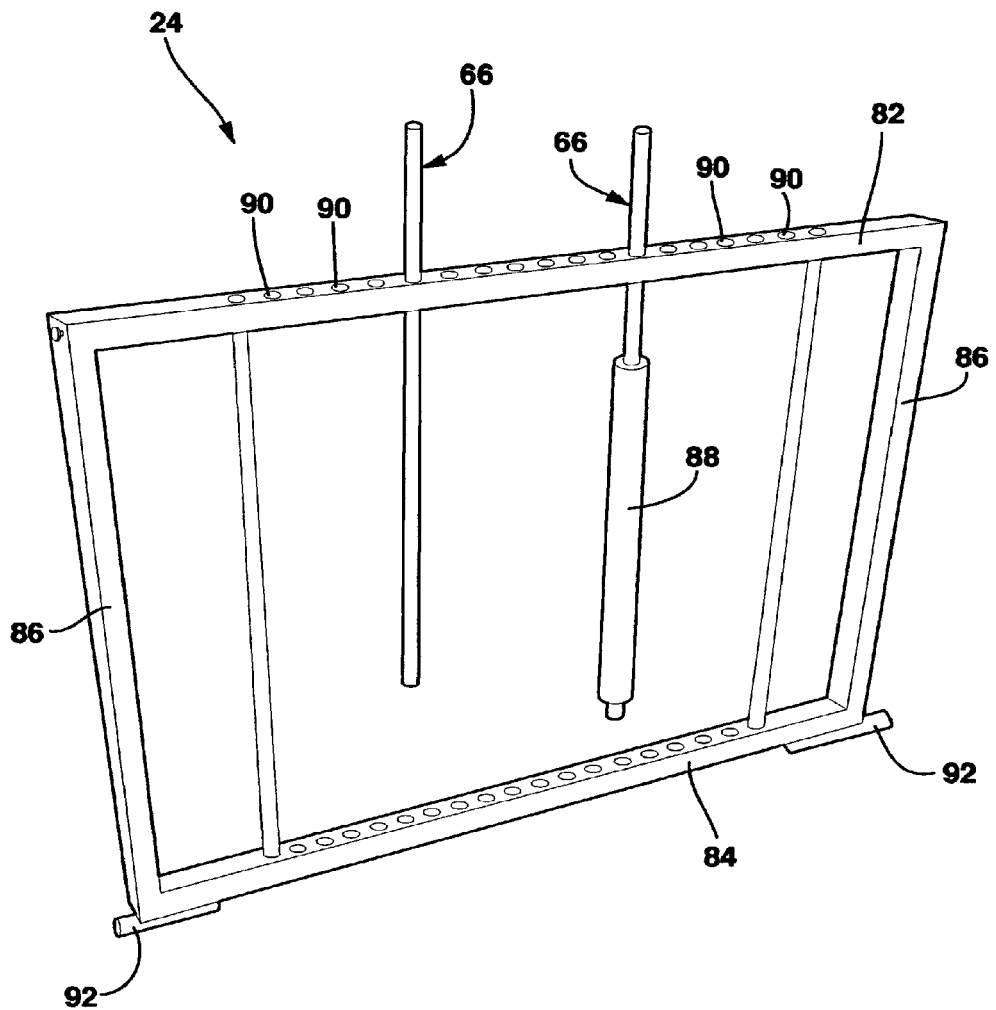
FIG. 6 is a perspective view of an access grate of the feed device of FIG. 1.

The feed device 10 includes at least one access grate 24 shown in detail in FIG. 6. Each access grate 24 has a plurality of access bars 80 that are spaced apart from each other in a substantially parallel arrangement. Each access grate 24 has a first attachment member 82 and a second attachment member 84 spaced away from the first attachment member 82 by attachment side members 86. The access bars 80 extend between the first attachment member 82 and the second attachment member 84. In the preferred embodiment of the feed device 10, the access bars 80 are spaced at desired separations to provide better access to the feed by animals of different sizes and ages.

Each access bar 80 is preferably an elongated bar, rod or tube made of a rigid material that maintains its shape despite contact with an animal during feeding using the feed device 10. In addition, each access bar 80 is preferably covered with a relatively soft material to protect the animal as it comes in contact with the access bar 80. For example, if the access bar 80 is made of a relatively rigid and strong materials such as steel, the access bar 80 may be coated with a relatively soft materials such as plastic or a sleeve 88 made of plastic or similar material may be placed over the access bar 80.

In a most preferred embodiment of the invention, the spacing of the access bars 80 is set to a desired spacing depending on the animals using the feed device and their size or age. As shown in FIG. 6, the first attachment member 82 and the second attachment member 84 each have access bar locating holes 90 placed along the respective first attachment member 82 and second attachment member 84 so that the ends of the access bars 80 may be located in desired access bar locating holes 90 to create the desired separation of the access bars 80. The access bar locating holes 90 may extend partially or wholly through a respective first or second attachment member 32 and are sized to receive an end of an access bar 80.

The access bar locating holes 90 are formed in the first attachment member 82 and second attachment member 84 at predefined locations corresponding to a desired separation of the access bars 80 or a series of access bar locating holes 90 are formed at small increments to allow a variety of desired separations of the access bars 80 to be had by appropriate location of access bars 80 in the access bar locating holes 90. As a result, a variety of distances between access bars 80 can be achieved. For example, for small calves it is desirable that the spacing between the access bars 80 be in the range of about between 3 inches and 4 inches. This allows the nose and mouth of the calf to have access to the feed but prevents the calf from sticking his or her head between the access bars 80 as it attempts to eat the feed. For larger cows the access bars 80 may preferably be spaced apart a distance of about between 4 inches and 6 inches. The spacing likewise allows these larger cows to have access to the feed but prevents the cows from sticking their whole head between the access bars 80. Likewise, for horses the spacing between the access bars 80 are preferably in the range of about 4 inches for foals or colts and between about 5 inches and 6 inches for more mature horses. The spacing between these access bars 80 may be adjusted for any sized animal according to the principles disclosed herein.

The access bars 80 may be held permanently in place in the access bar locating holes 90 by means well known in the art including, but not limited to, welding, adhesives, nuts and bolts, screws or frictional or mechanical fit. Alternately, the access bars 80 may be removably attached to the access bar locating holes 90 by methods well understood by those skilled in the art. One exemplary way to make the access bars 80 removable is to make the first attachment member 82 and second attachment member 84 each include a length of angle iron with access bar locating holes 90 and then bolt the first attachment member 82 and second attachment member 84 to the attachment side members 86. Removing the bolts allows the first attachment member 82 and second attachment member 84 to be removed which allows the access bars 80 to be repositioned in the access bar locating holes 90. Then, the first attachment member 82 and second attachment member 84 are re-bolted to the attachment side members 86.

Each access grate 24 pivots around a pivot 92 that is preferably a hinge but may be any other type of pivots as is well understood in the art. The pivot 92 is preferably located either on an opposed side fence 12 or attached to a corner post 18 so that the access grate 24, in a vertical configuration, is substantially above a respective opposed side fence 12.

Figure 5:
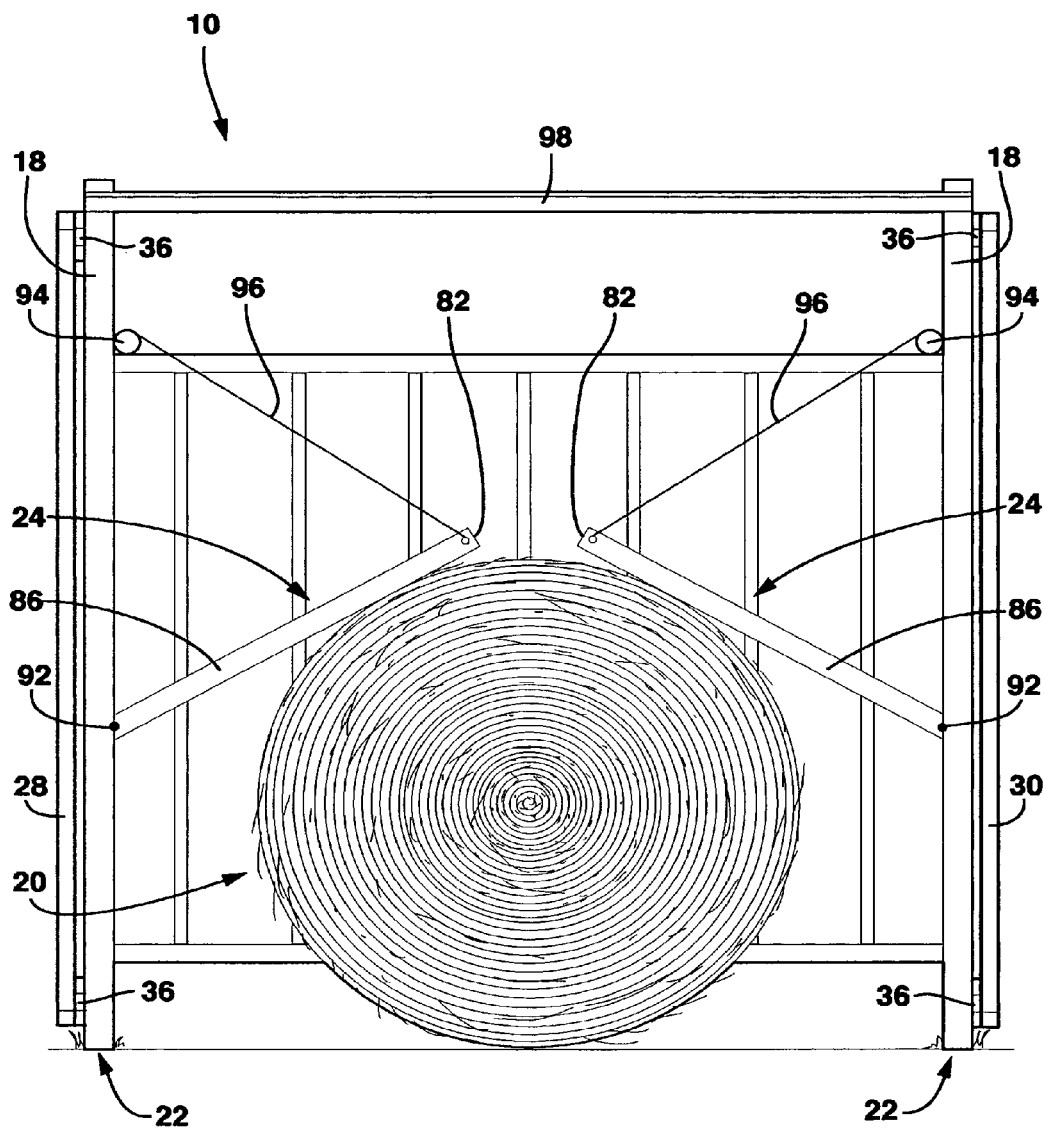
FIG. 5 is an end view of the feed device of FIG. 1 with the end gate open to show the feed placed in the feeder and with the access grates in contact with the feed.
Figure 8:
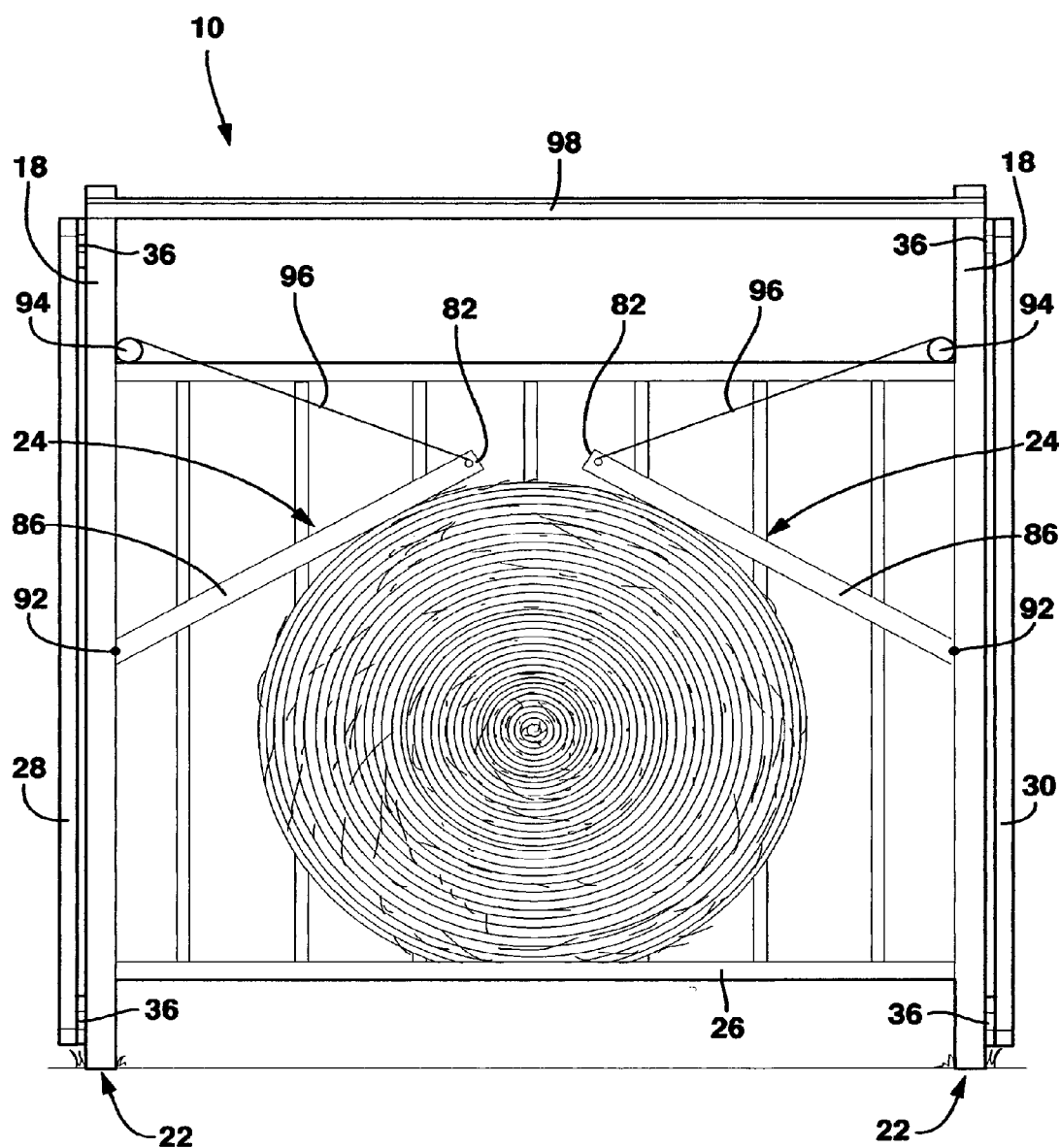
FIG. 8 is an end view of an alternate embodiment of the feed device of FIG. 1 with a bottom grate holding the feed above the ground.

Pivot 92 allows the access grate 24 to move from a position where the access grate 24 is substantially vertically oriented to a position where the access grate 24 comes in contact with the feed within the enclosure 20. Where a large amount of feed is in the enclosure 20, such as would be the case where a large bale of hay is placed in the enclosure 20, the access grate 24 in contact with the feed in the enclosure 20 might be in a substantially vertical orientation. However, as feed is removed by the animals, or if a lesser amount of feed is placed in the enclosure 20, the access grate 24 may move a considerable distance from its initial substantially vertical configuration to contact the feed within the enclosure 20. In fact, the access grate 24 may move from an initial substantially vertical configuration to a configuration where the access grate 24 contacts the ground where there is no bottom grate 26 as described hereafter or contact the bottom grate 26 where a bottom grate 26 is used in the feed device 10.

Where two access grates 24 are used as shown in FIGS. 5 and 8, each access grate 24 is preferably pivotally connected to an opposed side fence 12 or corner post 18 so that each access grate 24 is allowed to move from a substantially vertical configuration above or near an opposed side fence 12 inwardly towards the enclosure 20 to contact the feed within the enclosure 20. Preferably, each access grates 24 in this embodiment is sized so that the first attachment members 82 of the access grate 24 come close to but do not contact each other as they pivot around their respective pivots 42.

Where a single access grate 24 is used as shown in FIG. 7, the access grate 24 is preferably pivotally connected to an opposed side fence 12 or corner post 18 so that the access grate 24 is allowed to move from a substantially vertical configuration above or near an opposed side fence 12 inwardly towards the enclosure 20 to contact the feed within the enclosure 20. Preferably, the access grate 24 in this embodiment is sized so that its ultimate edge 62 does not extend entirely across the enclosure 20 as it pivots around its pivot 92.

It is desirable to control movement of each access grate 24 as it pivots around its pivot 92 in order to control the amount of feed that an animal or animals using the feed device 10 are able to eat in any given time period. This is preferably accomplished by connecting the ultimate edge 62 of each access grate 24 to device that limits the amount of movement the access grate 24 can make around its pivot 92. In a preferred embodiment of the feed device 10, this movement limiting device takes the form of a ratchet 94 that is preferably connected to the ultimate edge 62 of the access grate 24 through a cable 96. The ratchet 94 is preferably located on a corner post 18. The ratchet 94 allows the cable 96 to be paid out in desirable increments to allow the access grate 24 to descend from its original substantially vertical configuration towards the feed within the enclosure 20. In one embodiment of the feed device 10, the ratchet 94 is manually controlled to allow this movement of the access grate 24. The ratchet 94 also allows the access grate 24 to be retained in a substantially vertical configuration in order to facilitate the placing of feed into the enclosure 20.

In another embodiment of the feed device 10, the ratchet 94 automatically pays out a desired amount of cable 96 over a predetermined time to control the movement of the access grate 24. In this embodiment, a mechanical or electrical control system allows the ratchet 94 to advance at predetermined intervals and in predetermined amounts to allow the access grate 24 to descend onto the feed in the enclosure 20. For example, and not to limit the means for controlling such a ratchet as will be clear to those skilled in the art, a electrical version of such a means for controlling may include a microprocessor or application specific integrated circuit (ASIC) couple with and controlling an actuator that advances the ratchet 94 at the predetermined intervals and in predetermined amounts.

Where the ratchet 94 is an automated system, power to operate the ratchet 94 may come externally from a source of power like a power line, an electric power generator or a battery or power may be provided through a solar cell or wind generator connected to a battery. Alternately, the ratchet 94 may be powered by other devices that produce useful energy such as an air compressor, hydraulic pump or fluid or gas pump, such as is well understood in the art.

Although a ratchet 94 has been described as a preferred method of limiting the movement of the access grate 24, any other movement limiting device may also be used as is well understood in the art. For example, and intended only to illustrate another possible example of a movement limiting device, the cable 96 may take the form of a chain and the movement limiting device may be a slot cut in a sheet of metal attached to a corner post 18 through which a link of the chain is placed so that as one link passes through the slot, an adjoining link comes in contact with the metal plate to prevent movement of the chain through the metal plate.

In a preferred embodiment of the feed device 10 in all the embodiments disclosed herein, the feed device 10 has a roof 98 covering at least the enclosure 20. This roof 98 protects feed within the enclosure 20 from undesirable contact with the elements. The roof 98 may be flat or sloped as desired and provides both protection from the sun as well as rain, wind or snow. Further, either the end fence 14 or pivoting end fence 16 or both may extend a distance above the height of the opposed side fences 12 to protect feed within the enclosure 20 from undesirable contact with the elements.

In use, the access grate 24 or access grates 24, if two access grates 24 are used, are pivoted around their respective pivots 42 into substantially a vertical configuration. If a movement limiting device such as a ratchet 94 and cable 96 is used, they are set to hold the access grate 24 in this substantially vertical configuration. The pivoting end fence 16 is opened to allow feed to be placed in the enclosure 20 through the pivoting end fence 16. The feed is placed in the enclosure 20 and each access grate 24 is pivoted around the pivot 92 into contact with the feed in the enclosure 20. If a movement limiting device such as a ratchet 94 and cable 96 is used, they are then set to allow the access grate 24 to contact the feed. Where the movement limiting device is automatic, its function is activated to allow the movement limiting device to allow the access grate 24 to pivot around the pivot 92 in predetermined intervals and in predetermined amounts to allow the access grate 24 to descend onto the feed in the enclosure 20. The animal is then allowed to approach the feed device 10 and begin eating the food in the enclosure 20 by placing its mouth between the access bars 80. The spacing between the access bars 80 prevents the animal from placing its entire head between the access bars 80 and thereby getting excessive access to the feed. Further, this spacing helps to prevent the animal from scattering the food. When the feed has been consumed, the movement limiting device, if present, is deactivated and each access grate 24 is pivoted around its pivot 92 away from the enclosure 20 to allow new feed to be placed in the enclosure 20 whereafter each access grate 24 is pivoted into contact with the feed as described above.

An alternate embodiment of the feed device 10 is shown in FIGS. 10-13. This embodiment of the feed device 10 is especially adapted for so-called square bales of feed, particularly small square bales. In this embodiment of the feed device 10, a box 100 having a front side 102 and a back side 104 holds the bale within an enclosure 20. In the embodiment shown in FIG. 12, the box 100 has a floor 106, a top wall 110 and a pair of sides 112 and the enclosure 20 is formed between the floor 106, top wall 110 and a pair of sides 112. The floor 106 and each of the sides 112 are attached preferably at about a 90° angle.

The floor 106 preferably has a lip 114 that extends upward at the back side 104 of the floor 106 at an angle preferably of about 90° to the plane of the main body of the floor 106. The function of the lip 114 is to retain a bale in the box 100 and keep the bale from sliding downward out of the box 100 along the floor 106. Where the box 100 is dimensioned to receive a small bale, this lip 114 might extend upward about four to six inches. Where the box 100 is dimensioned to receive a large bale, this lip 114 might extend upward about eight inches to about one foot. These dimensions for lip 114 are purely exemplary. Other lengths for lip 114 may be used so long as the lip 114 holds a bale in the box 100.

The top wall 110 is attached to the sides 112 by a pivot 116 that is preferable a pair of hinges. The pivot 116 allows the top wall 110 to rotate up to allow a bale to be placed in the box 100 from the back side 104 and then allow the top wall 110 to rotate down to rest on the bale. The top wall 110 has a length that allows the top wall 110 to come close to or contact the lip 114 when there is no bale in the box 100 or when the bale has been eaten to the point that the top wall 110 can pivot into contact with or near contact with the lip 114.

It is preferred, but not required, that a stretchable cord 118 connect the top wall 110 to the lip 114 or the sides 112 to provide a bias to the top wall 110 into the bale within the box 100. This way, as the animal eats the bale from the front side 102 as will be described hereafter, the bale will be biased to move forward toward the front side 102 thereby making it easier for the animal to have access to the bale.

In a variant of this embodiment, the feed device 10 may include a back wall 108 in the alternative or in addition to the top wall 110 described above. In such a variant, the back wall 108 may be pivotally attached to the lip 114 so that the back wall 108 may pivot out of the way to allow a bale to be placed through an opening 120 at the back side 104.

Figure 13:
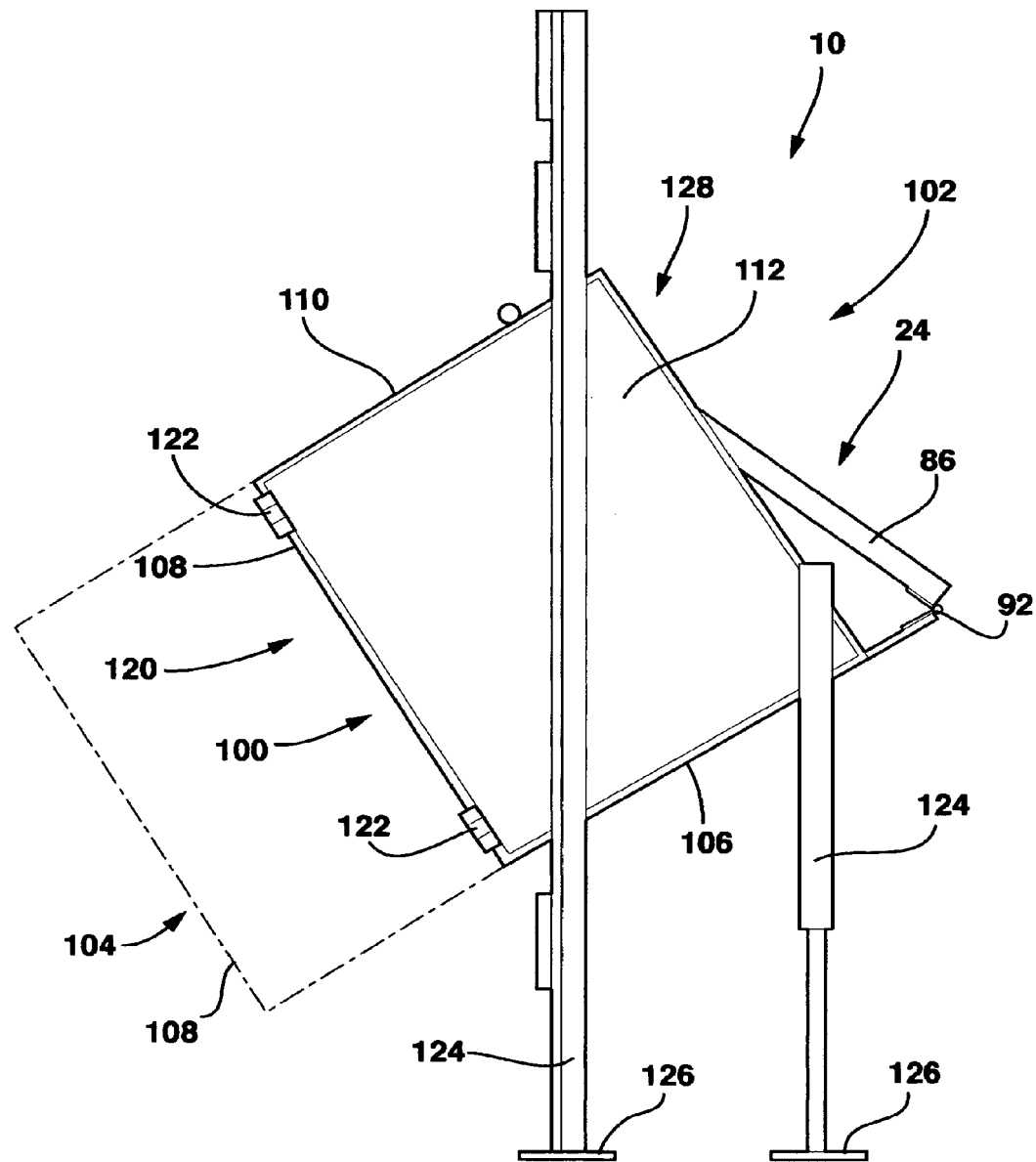
FIG. 13 is an end view of an alternate embodiment of the feed device of FIG. 10.
Figure 14:
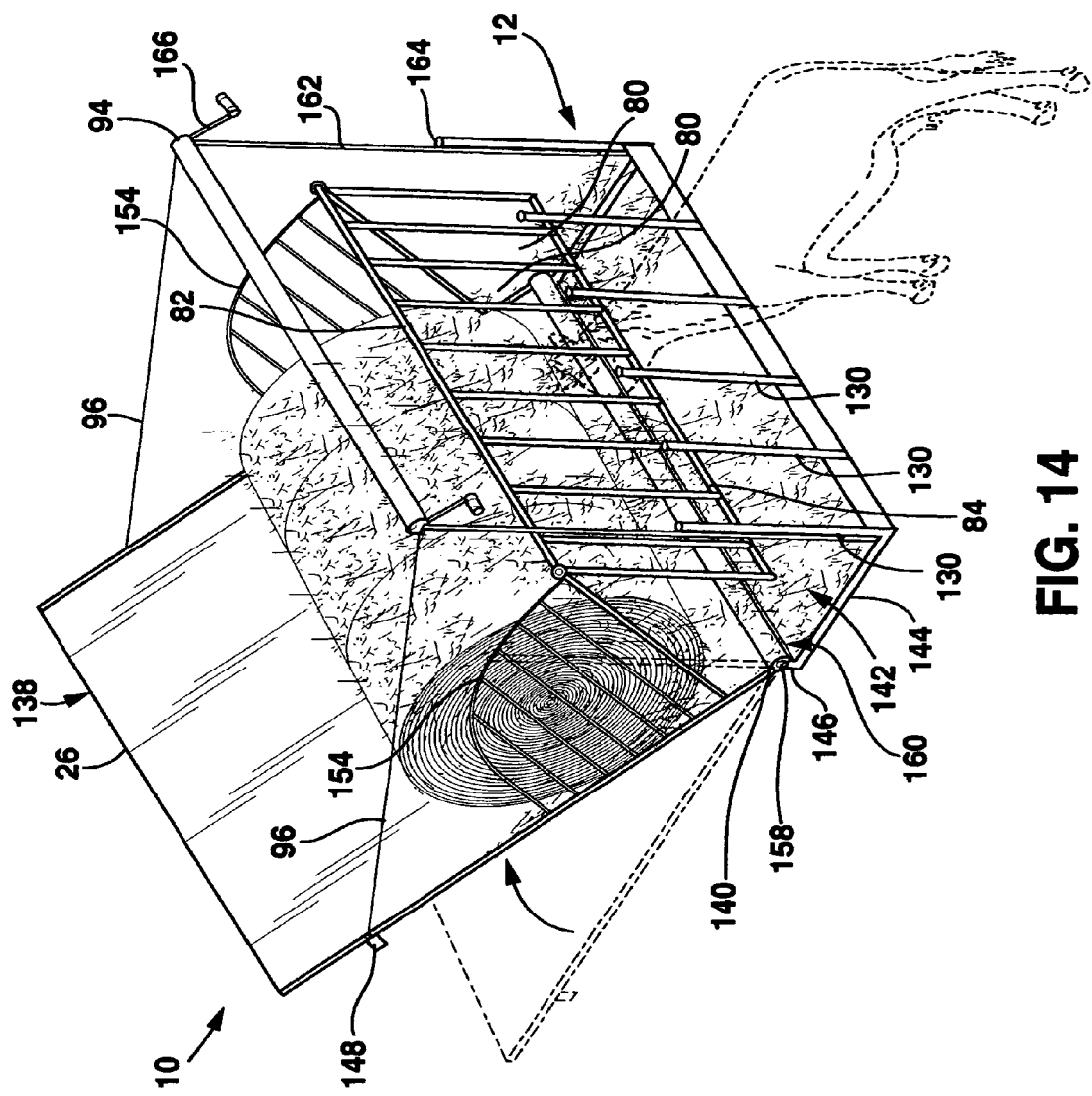
FIG. 14 is a perspective view of another embodiment of the feed device of the present invention.

In the embodiment of the feed device 10 shown in FIG. 13, the box 100 has a floor 106, a back wall 108, a top wall 110 and a pair of sides 112. The floor 106 and the back wall 108 are attached preferably at about a 90° angle and the back wall 108 and the top wall 110 are attached preferably at about a 90° angle. The sides 112 are attached to respective ends of the floor 106, back wall 108 and top wall 110 also preferably at about a 90° angle to each of the floor 106, back wall 108 and top wall 110. As a result, the enclosure 20 is formed that is bounded by the floor 106, back wall 108, top wall 110 and sides 112. Because the floor 106 and the back wall 108 are attached preferably at about a 90° angle and the back wall 108 and the top wall 110 are attached preferably at about a 90° angle, an opening 120 is produced between the floor 106 and the top wall 110 and between the sides 112 at the back side 104 of the box 100. It may be desirable in this embodiment as well to have a lip 114 at the junction between the floor 106 and back wall 108 to hold the bale in the enclosure 20.

In the embodiment of the feed device 10 shown in FIG. 13, the back wall 108 may be attached to one or more sides 112 through hinges 122 connecting the back wall 108 to one or more sides 112. In this embodiment of the feed device 10, the back wall 108 may be in two sections with each section attached to a respective side 108 through hinges 122. As a result, the opening 120 is accessed when the back wall 108 is rotated around the hinge or hinges 122.

The size of the box 100 in either of these embodiments and consequently the floor 106, back wall 108, top wall 110 and sides 112 making up the enclosure 20, is preferably large enough to allow a common square bale to be placed within and retained in the enclosure 20. The square bale can be one of the smaller type or a larger bale (approximately 3'×3' by 8') with the feed device 10 sized accordingly to receive such bales.

The feed device 10 in these embodiments includes legs 124. The legs 124 support the box 100, and consequently the enclosure 20, above the ground. In a preferred embodiment of the feed device 10, the legs 124 may be adjustable in length so that the enclosure 20 may be placed at a desired distance above the ground. In another embodiment of the feed device 10, the legs 124 are not adjustable in length but are chosen to have lengths that place the enclosure 20 at a desired distance above the ground. The legs 124 may be attached to the sides 112, floor 106, back wall 108 or any combination of these by means well understood in the art, including but not limited to, welding, adhesives, nuts and bolts, screws or frictional or mechanical fit. Further, the legs may rest on skids 126 that allow the feed device 10 to be pulled or pushed across the ground on the skids 126.

An access grate 24 is attached to either the floor 106 (FIG. 12) or top wall 110 (FIGS. 10 and 11) by a pivot 92 so that the access grate 24 pivots around the pivot 92 into the opening 120. The access grate 24 may be allowed to freely pivot around the pivot 92 to contact feed in the enclosure 20 or may include a movement limiting device such as the ratchet 94 and cable 96 described above as well as all other alternate movement limiting devices. Where a ratchet 94 and cable 96 are used, the ratchet 94 may be attached to the upper end of a side 94 or the top wall 110 and the cable 96 attached to the access grate 24 at or near the ultimate edge 62 of the access grate 24.

In use, a bale is placed in the feed device 10. In one embodiment of the feed device 10, the access grate 24 is pivoted around the pivot 92 away from the enclosure 20 thereby allowing access to the enclosure 20 through an opening 128 formed in the front side 102 of the box 100. A square bale is then placed through the opening 128 into the enclosure 20. In an embodiment of the feed device where top wall 110 pivots around the pivot 116, the top wall 110 is moved into a substantially vertical orientation so that the opening 120 is accessible. The bale is placed into the enclosure 20 through the opening 120 whereafter the top wall 110 is pivoted around the pivot 116 into contact with the bale. In the embodiment of the feed device 10 where the back wall 108 pivots around the hinges 122, the back wall 108 is opened and a bale is placed into the enclosure 20 through the opening 120.

In any of this group of embodiments of the feed device 10, once the bale is located in the enclosure 20, the access grate 24 pivoted around the pivot 92 into contact with the bale in the enclosure 20. If a movement limiting device such as a ratchet 94 and cable 96 is used, it is set to allow the access grate 24 to contact the bale. Where the movement limiting device is automatic, its function is activated to allow the movement limiting device to allow the access grate 24 to pivot around the pivot 92 in predetermined intervals and in predetermined amounts to allow the access grate 24 to descend onto the feed in the enclosure 20. When the feed has been consumed, the movement limiting device, if present, is deactivated and the access grate 24 is pivoted around the pivot 92 away from the enclosure 20 to allow new feed to be placed in the enclosure 20 through the opening 120 or opening 128 as described above whereafter the access grate 24 is pivoted into contact with the feed as described above.

Because the feed device 10 in whatever form is used in an environment where it will come in contact with animals, particularly large farm animals, the feed device 10 must be made of material that is rugged enough to withstand such contact without deformation or damage. So, in the preferred embodiment of the feed device 10, the device is preferably made of a rigid and strong material such as steel of a sufficient thickness or configuration, as is well understood in the art, to withstand contact with such animals.

An alternate embodiment of the feed device 10 is shown in FIGS. 14-18. This embodiment of the feed device 10 is particularly adapted to feeding cows because the feed device 10 presents feed at a relatively high level above the ground. Cows are able to relatively easily eat feed at this level whereas some other animals, such as horses, typically do not like eating feed that is located above the ground because they get dust from the feed in their eyes and nose.

The feed device 10 in this embodiment includes a side fence 12. However, the side fence 12 in this embodiment prevents an animal using the feed device 10 from getting too close to the feed but instead allows the animal to put its head and neck through the side fence 12 to access the feed as will be described hereafter. Consequently, the side fence 12 in this embodiment has a series of vertically oriented parallel spacer bars 130 that extend between a horizontal first side fence attachment member 132 and a spaced away horizontal second side fence attachment member 134. The spacer bars 130 are spaced a distance to allow the animal using the feed device 10 to pass its neck and head between the spacer bars 130 but not its chest. As a result, in use of the feed device 10, the animal's chest will come into contact or near contact with the spacer bars 130 when the animal eats the feed contained in the feed device 10.

In this embodiment of the feed device 10, the bale of feed rests substantially on a bottom grate 26. The bottom grate 26 has a first end 136, a second end 138 and a pivot 140 located at the first end 136. The first end 136 of the bottom grate 26 is preferably located close to the ground although it is not required to be. The pivot 140 preferably takes the form of one or more hinges as will be well understood in the art.

A trough 142 having a bottom panel 144 and a pivot support 146 extends between the side fence 12 and the pivot 140 to space the pivot 140 a short distance from the side fence 12. The space between the side fence 12 and the pivot support 146, and consequently the pivot 140, is preferably a distance so that as the second end 138 of the bottom grate 26 is moved upward as will be described hereafter, the animal using the feed device 10 and having its chest pressed against and constrained by the side fence 12 will be able to reach the feed through an access grate 24 as will be described hereafter. The bottom panel 144 catches any feed that may fall down into the trough 142 as the animal eats so that the animal may also eat this feed as well.

As mentioned above, the first end 136 of the bottom grate 26 is preferably located close to the ground. Consequently, the pivot support 146 also preferably locates the pivot 140 close to the ground although it is not required that the pivot 140 be located close to the ground. Where the bottom grate 26 is not located on the ground, a bottom grate support 148 is preferably located at or near the second end 138. The bottom grate support 148 has a height about equal to the height of the pivot support 146 so that at rest the bottom grate 26 is about horizontal.

Figure 15:
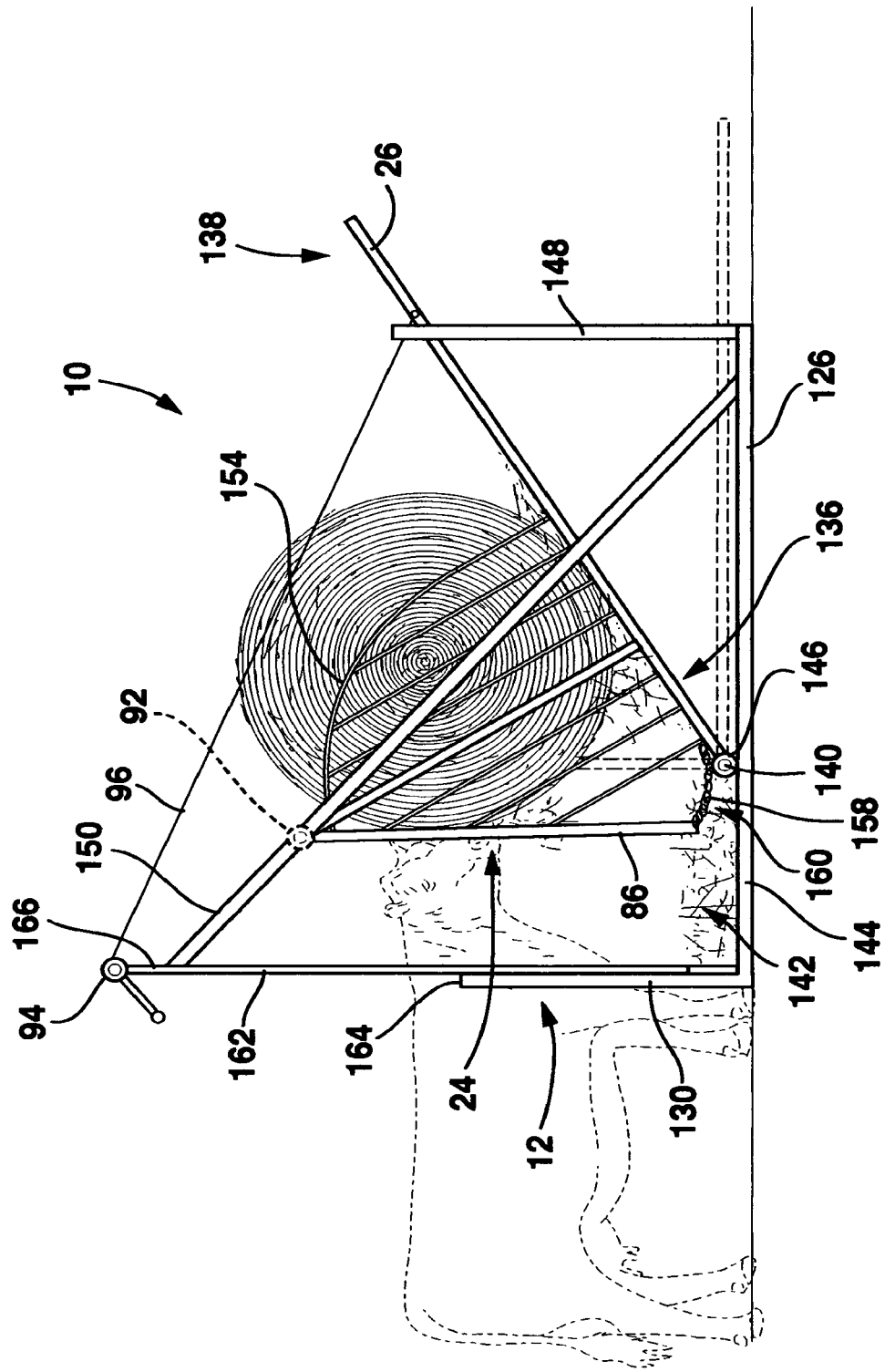
FIG. 15 is an end view of an alternate embodiment of the feed device of FIG. 14 in use.

In one variant of this embodiment of the feed device 10 shown in FIG. 15, a pair of access grate holders 150 located on opposite sides of the bottom grate 26 extend between the upward projections 162 and skids 126 located on the ground. The access grate holders 150 pivotally hold an access grate 24 so that the access grate 24 is suspended from and hangs down from near the top of the access grate holder 150 through pivots 92. Pivots 92 are preferably pivot points or hinges that connect the access grate 24 to the access grate holder 150.

Figure 16:
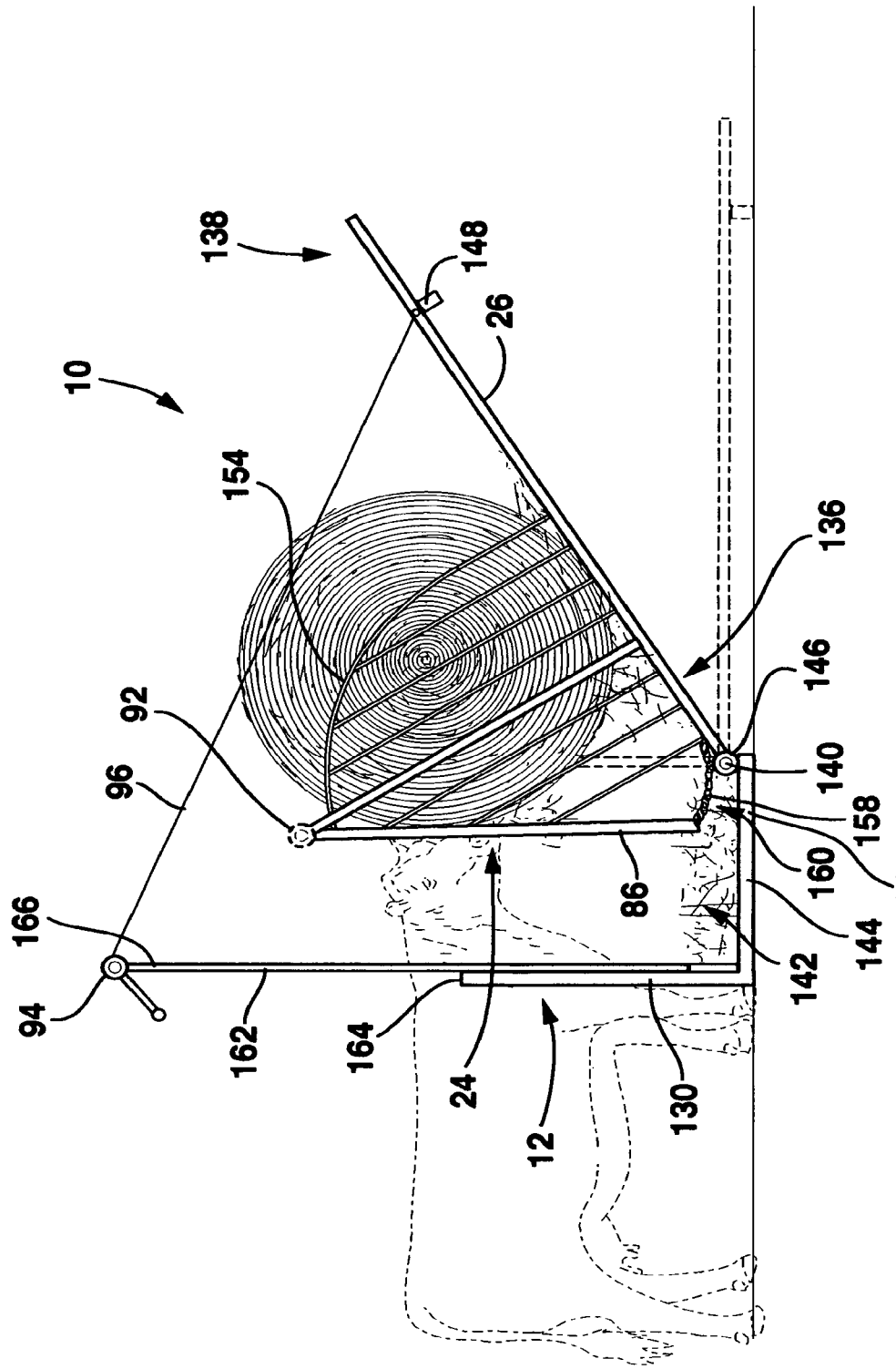
FIG. 16 is an end view of the embodiment of the feed device of FIG. 14 in use.
Figure 17:
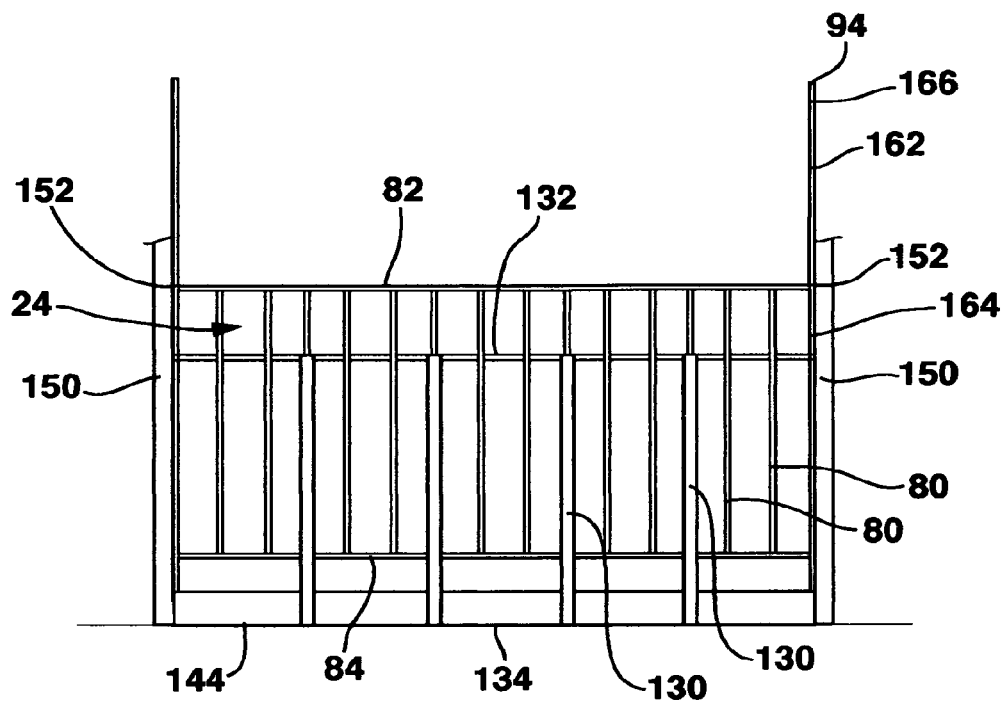
FIG. 17 is a side view of the feed device of FIG. 16.
Figure 18:
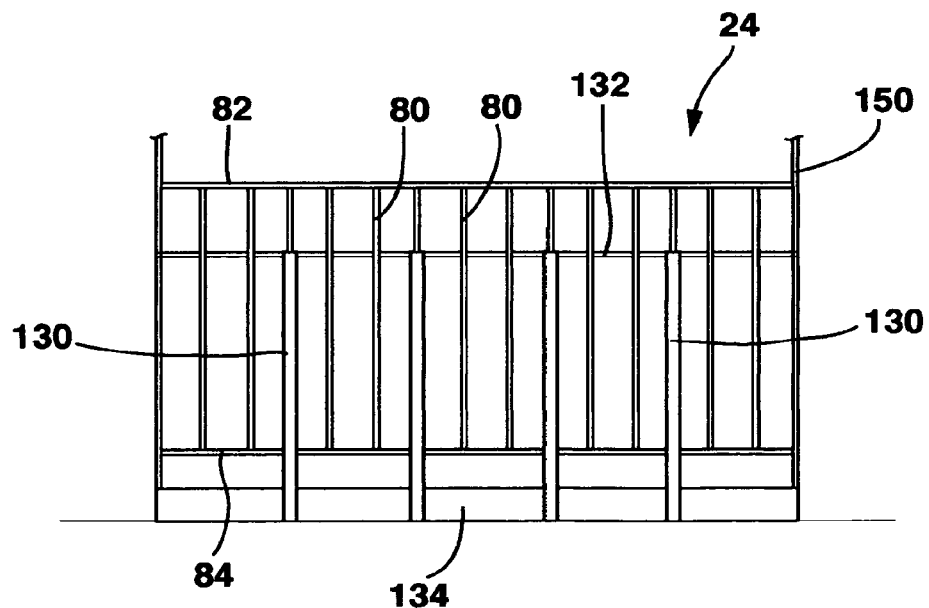
FIG. 18 is a side view of the feed device of FIG. 14.

In another variant of this embodiment of the feed device 10 shown in FIG. 16, the bottom grate 26 itself has the access grate holder 150 attached at or near the first end 136. The access grate holder 150 in this variant also holds an access grate 24 so that the access grate 24 is suspended from and hangs down from near the top of the access grate holder 150 again through pivots 92. Here as well, the pivots 92 are preferably pivot points or hinges that connect the access grate 24 to the access grate holder 150.

In either of these variations, a feed containment fence 154 preferably extends from the bottom grate 26 upward on both ends of the bottom grate 26 to retain feed on the bottom grate 26. The feed containment fence 154 may be affixed permanently to the bottom grate 26. Alternately, where the access grate holder 150 is itself attached to the bottom grate 26, the feed containment fence 154 may be pivotally connected to the access grate holder 150 so that the feed containment fence 154 may be pivoted out of the way to allow the feed to be placed on the bottom grate 26.

Also, a rigid end fence 14 or pivoting end fence 16 may be placed on opposite sides of the bottom grate 26 to prevent animals from having access to the feed on the bottom grate 26 from the ends of the bottom grate 26. Alternately, the feed device 10 may be placed in or slightly displaced from a fence line so that side fence 12 or pivot support 146 is part of a fence line. In this way, the animal using the feed device 10 is on one side of the feed device 10 while the feed itself is on the other side. In any event, the feed is placed on the bottom grate 26 from the back side 156 or end of the feed device 10. Where the feed is placed on the bottom grate 26 from the back side 156, the back side 156 is preferably open to allow the feed to be placed on the bottom grate 26. Alternately, the back side 156 may have a pivoting end fence 16 or similar structure to allow access to the bottom grate 26 to place feed on the bottom grate 26.

As described above, the access grate 24 is a substantially planar grate comprised of a series of substantially vertical access bars 80 extending between substantially horizontal and spaced apart first attachment member 82 and second attachment member 84. The vertical access bars 80 are preferably spaced apart in a parallel fashion a distance that allows the animal using the feed device 10, such as a cow, to place its nose and mouth between the access bars 80 but not so far apart as to allow the animal to place its entire head between the access bars 80. In addition, the vertical access bars 80 may be covered with a sleeve 88 as described above to protect the nose, mouth and face of the animal using the feed device 10. In this way, the animal may have access to the feed without allowing the animal to get its head stuck between the access bars 80.

A vertical access grate movement limiter 158 is preferably attached to the second attachment member 84 and the access grate holder 150 or the first end 136 of the bottom grate 26 (FIGS. 15 and 16) to limit the distance the access grate 24 may move away from the access grate holder 150 as the second end 138 of the bottom grate 26 is elevated as will be described hereafter. This vertical access grate movement limiter 158 is preferably a chain, cable or other similar device that allows the access grate 24 to move away from the access grate holder 150 no more than the length of the vertical access grate movement limiter 158 thereby forming a gap 160 between the second attachment member 82 and the first end 136 of the bottom grate 26. The vertical access grate movement limiter 158 may have either a permanent length or be adjustable in length, as for example a chain having a link retaining slot, to accommodate different types of feed.

The side fence 12 preferably has at least one upward projection 162 that extends upward from the uppermost edge 164 of the main part of the side fence 12. The upward projection 162 has a most upward end 166. In a preferred embodiment of the feed device 10, the most upward end 166 of the upward projection 162 has a movement limiting device preferably in the form of a ratchet 94 whether manually or automatically controlled. The ratchet 94 is connected to the second end 138 of the bottom grate 26 by a cable 96 or other similar device so that the ratchet 94 draws the second end 138 toward or allows the second end 138 to fall away from the ratchet 94 as the ratchet 94 operates.

As the ratchet 94 draws the second end 138 towards the ratchet 94, the bottom grate 26 pivots upward around the pivot 140. In the preferred embodiment of the feed device 10, the second end 138 of the bottom grate 26 is raised upward by the ratchet 94 so that the second attachment member 84 of the access grate 24 moves no more than about 12 to 14 inches from the pivot 140 to form the gap 160. In addition, under gravity, the feed on the bottom grate 26 will move into contact with the access grate 24 and thereby be accessible to the animal using the feed device 10 even though feed is removed as the animal eats the feed.

As a result, as described above, a gap 160 is formed between the second attachment member 84 and the pivot 140 so that any feed knocked loose by the animal using the feed device 10 will fall downward and pass between the gap 160 into the trough 142 formed between the side fence 12 and the pivot support 146. By catching this disturbed feed in the trough 142, the animal using the feed device 10 will be able to eat this feed as well thereby saving this feed from being discarded or spoiling.

Although this embodiment of the feed device 10 has been described as having a gap 160, an alternate embodiment of the feed device 10 may not include a vertical access grate movement limiter 158. In this embodiment of the feed device 10 shown in FIG. 14, the access grate 24 is allowed to pivot freely about the pivots 92 as the bottom grate 26 is raised by the ratchet 94. In another alternate embodiment of the feed device 10, the access grate 24 is rigidly secured to the access grate holder 150 so that the access grate 24 does not pivot around the pivots 92.

Also, although a movement limiting device in the form of a ratchet 94 has been listed as the preferred movement limiting device, as shown in FIG. 15, the bottom grate support 148 itself can act as a movement limiting device in addition to or in the alternative to the ratchet 94 and cable 96. Where the bottom grate support 148 acts as a movement limiting device, the bottom grate support 148 preferably pivots so that the bottom grate support 148 is preferably substantially vertical and supports the second end 138 of the bottom grate 26. In use, the second end 138 of the bottom grate 26 is raised, either by the ratchet 94 and cable 96 or by lifting the second end 138 with a lift, for example, on a tractor. The bottom grate support 148 is then pivoted so that it is moved into a substantially vertical configuration and the bottom grate 26 is lowered so that the bottom grate support 148 supports the weight of the bottom grate 26 and the feed on the bottom grate 26. Alternately, the bottom grate support 148 may itself lift the second end 138 of the bottom grate 26 by extending the length of the bottom grate support 148 by, for example, a screw or jacking mechanism as will be clear to those skilled in the art.

Figure 19:
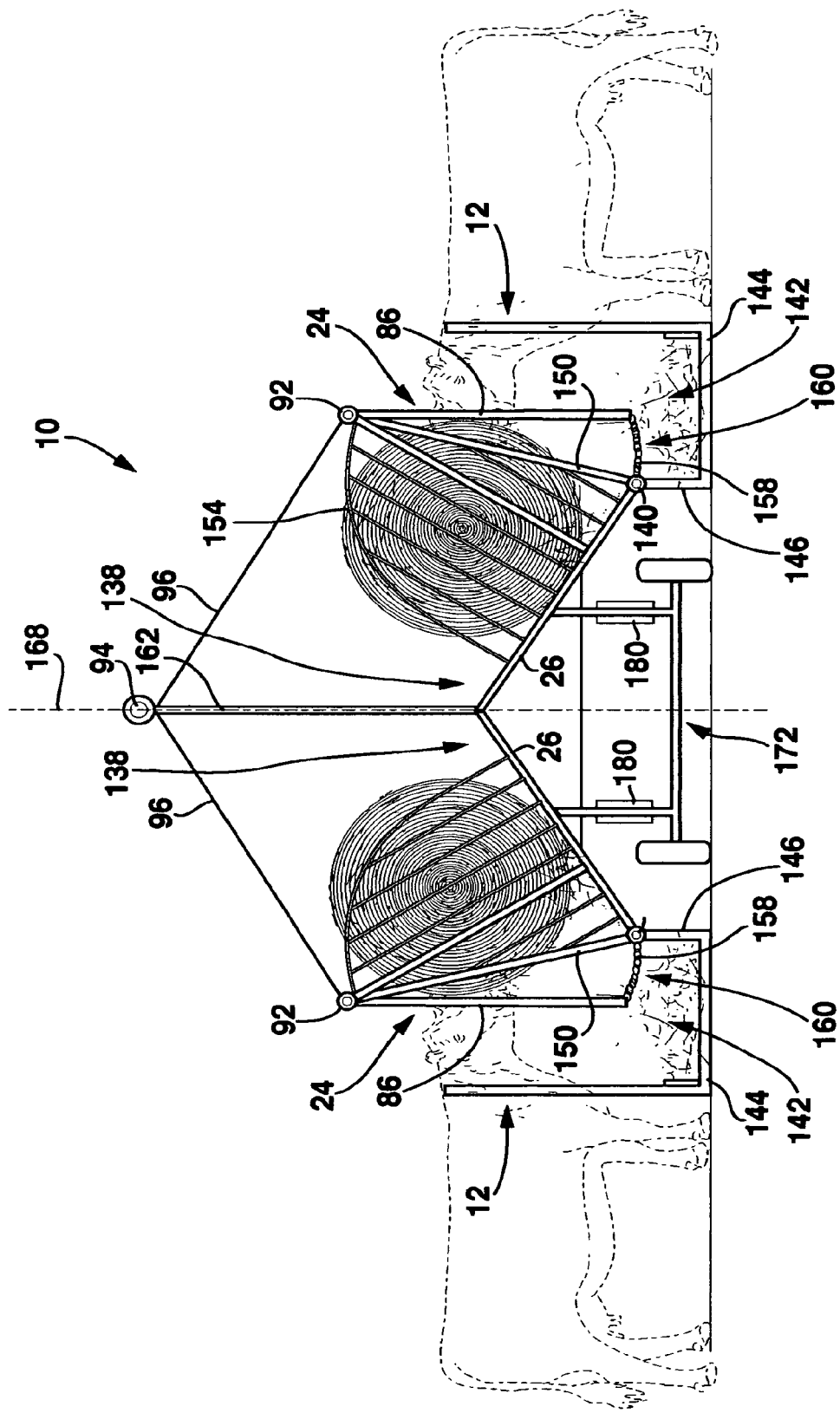
FIG. 19 is an end view of an alternate embodiment of the feed device of FIG. 14.

FIG. 19 shows an alternate embodiment of the feed device 10 shown in FIGS. 14 through 18. In this embodiment of the feed device 10 there are two bottom grates 26 extending away from a center axis 168. Each bottom grate 26 is connected to a pivot 140 as described above and are located on opposite sides of the center axis 168. The ratchet 94 and cable 96 are attached to an upward projection 162 that extends upward from a center point 170 located between the bottom grates 26.

The feed in this embodiment is placed on the bottom grates 26 over the top of the access grate holder 150. Alternately, the feed containment fence 154 may be pivotally connected to the access grate holder 150 so that the feed containment fence 154 may be pivoted out of the way to allow the feed to be placed on the bottom grate 26. In this embodiment of the feed device 10, animals using the feed device 10 have access to the feed located on the respective bottom grates 26 from either side of the feed device 10. In this embodiment of the feed device 10, all the features of the other embodiments of the feed device 10 mentioned above may be included as desired.

Although the embodiments shown in FIGS. 14-19 have been described as being particularly useful for feeding cows, these embodiments are also useful for feeding other animals including, but not limited to, sheep, goats, deer and llama. Further, the embodiments shown may use feed in either round or square bales or even loose feed. Also, the access grate holder 150 has been shown as being attached to the bottom grate 26 at substantially a 90° angle. But, the access grate holder 150 may be attached to the bottom grate 26 at angles other than 90°. In addition, any of the embodiments of the feed device 10 may be sized to receive one or more bales located side by side in the enclosure 20.

Although the pivot 92 or pivots 92 of the feed device 10 have been described as preferably being one or more hinges that prevent the access grate 24 from being separated from the opposed side fence 12 or corner post 18 in the embodiments of FIGS. 1-9, the floor 106 or top wall 110 of the embodiments of FIGS. 10-13 and access grate holder 150 of FIGS. 14-19, the hinge of the pivots 92 may also allow the access grate 24 to be temporarily removed from its attachment to the opposed side fence 12 or corner post 18, floor 106 and top wall 110 or access grate holder 150 by removing the center post of the hinge or otherwise disassembling the hinges as will be clear to those skilled in the art. This configuration could allow the access grate 24 to be removed to perhaps facilitate rearranging the access bars 80 to create new or different spacing or the access bars 80 or to allow different access grates 24 to be placed on the feed device 10 having spacings of the access bars 80 chosen to allow rapid changing from an access grate 24 having a first spacing of access bars 80 to a different access grate 24 having a second spacing of access bars 80.

In embodiments of the feed device 10, the feed device 10 in whatever form is more or less permanently placed in a certain location. Where this occurs, it may be desirable to anchor the feed device 10 to the ground. This may be done by sinking one or more corner posts 18 or portions of the side fence 12 or pivot support 146 into the ground, possibly into concrete, by tethering the feed device 10 to the ground via a cable or chain connected to an earth anchor as is well understood in the art or by forming part of the feed device 10 into or as part of a fence.

Alternately, it may be desirable to move the feed device 10, for example, to where the animals or a particular source of feed is located. For example, where a large bale is used as a source of feed and where the feed device 10 does not include a bottom grate 26, the pivoting end fence 16 may be opened as described above and the feed device 10 pulled towards the feed so that the feed passes through the open pivoting end fence 16 into the enclosure 20. Once the feed is located within the enclosure 20, the pivoting end fence 16 may be closed. In the embodiment of the feed device 10 that is movable, it may be desirable to place skids 126 on at least the bottom surface 22 of the opposed side fences 12 or legs 124 to better allow the feed device 10 to be pulled across the ground.

Figure 20:
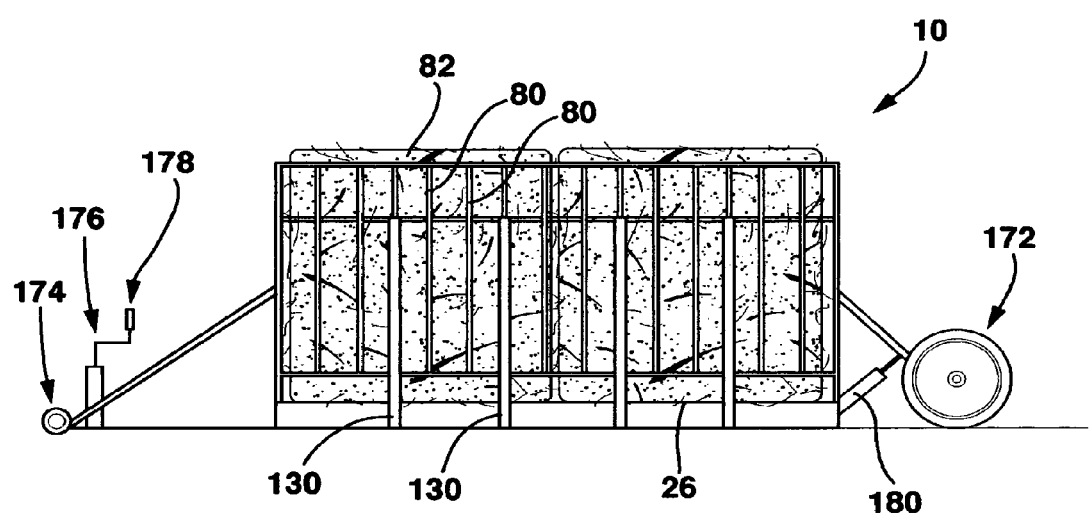
FIG. 20 is a side view of an alternate embodiment of the feed device of the present invention.

FIG. 20 shows an alternate embodiment of the feed device 10 applicable to any embodiment of the feed device 10 described above. In this embodiment, the feed device 10 has a wheel assembly 172 attached to at least one end of the feed device 10 and a hitch mechanism 174 at one end, usually the opposite end where only a single wheel assembly 172 is used. In use, a vehicle such as a tractor or truck, is connected to the hitch mechanism 174 by hitching combinations well understood in the art such as hitch ball and socket, three point hitch or pin and loop hitching mechanisms. It will typically be necessary to raise the hitch mechanism 174 up off the ground in order to move the feed device 10. To accomplish this, a hitch lifting device 176 may be attached to or near the hitch mechanism 174 so that activating the hitch lifting device 176 will cause the hitch mechanism 174 to be raised up off the ground. An example of such a hitch lifting device 176 is a common worm screw device such as is used to lift the tongues of trailers by rotation of a handle 178 located at the top of the hitch lifting device. Alternately a hydraulic mechanism, such as are commonly found on farm equipment, may be used to lift the hitch mechanism 174. Further, a hydraulic lift 180 may be attached between the feed device 10 and the wheel assembly 172 to lift the feed device 10 near the wheel assembly 172.

In any event, once the hitch mechanism 174 has been elevated, the main body of the feed device 10 will also be lifted off the ground so that a substantial portion of the weight of the feed device 10 will be resting on the wheel assembly 172. It may be desirable to further raise the feed device 10 near the wheel assembly 172 by activating the hydraulic lift 180. At this point, the tractor, truck or similar device, may move the feed device 10 to a desired location by pulling or pushing the feed device 10 as the vehicle travels across the ground with the feed device 10 supported by the wheel assembly 172. Alternately, as described above, the feed device 10 may have one or more wheel assemblies 172 so that the feed device 10 is essentially located on a trailer.

While the above description contains many specificities, these should not be construed as limitations on the scope of the invention, but rather as examples of preferred embodiments thereof. As a result, the description contained herein is intended to be illustrative and not exhaustive. Many variations and alternatives of the described technique and method will occur to one of ordinary skill in this art. Variations in form to the component pieces described and shown in the drawings may be made as will occur to those skilled in the art. Further, although certain embodiments of a feed device 10 have been described, it is also within the scope of the invention to add other additional components or to remove certain components such as windmill or solar panel to provide power to the feed device 10.

In all the embodiments of the feed device 10 disclosed herein, the access grate 24 is supported so that the access grate 24 either pivotally moves into contact with the animal feed or pivots to allow the animal feed to move into contact with the access grate 24 whereafter the animal accesses the feed through the access grate 24. Sometimes the access grate 24 is directly connected to the structure forming the enclosure 20 and sometimes the access grate 24 is connected to structure that is connected with or to or is associated with structure that forms the enclosure 20. In any event, the access grate 24 is intended to limit access to feed, especially in an enclosure 20, and also to help prevent spillage or waste from an animal's interaction with the feed. Further, although the access grate 24 has been described as having a plurality of access bars 80, the access grate 24 may also be formed of a mesh (i.e., intersecting access bars 80) or a solid or mesh piece of material with holes formed in it to allow access to feed through the solid or mesh piece.

In addition, the specific pieces that form the structure resulting in an enclosure 20 in all the embodiments described herein may be modified so long as an enclosure 20 appropriate to hold feed is formed. Also, variations in the shape or relative dimensions of the feed device 10 or components of the feed device 10, including but not limited to variations in the shape or relative dimensions of the opposed side fences 12, rigid end fence 14, pivoting end fence 16, corner posts 18, enclosure 20, access grates 24, roof 98, box 100, legs 124, skids 126, spacer bars 130, trough 142, access grate holders 150 as well as other parts of the feed device 10 will occur to those skilled in the art and still be within the scope of the invention.

All these alternatives and variations are intended to be included within the scope of the attached claims. Those familiar with the art may recognize other equivalents to the specific embodiments described herein which equivalents are also intended to be encompassed by the claims attached hereto. As a result, while the above description contains may specificities, these should not be construed as limitations on the scope of the invention but rather as examples of different embodiments thereof.

I claim:

1. A feed device for providing feed to animals comprising: structure forming an enclosure for containing animal feed, the structure having a plurality of corners; at least one access grate having a plurality of access bars spaced apart to allow an animal access to the feed contained within the enclosure, the access bars each having ends; and means for supporting the access grate through a pivot to allow the access grate to either move into contact with the animal feed or allow the animal feed to move into contact with the access grate, wherein the structure forming an enclosure comprises: a pair of opposed side fences; a corner post located at each corner of the feed device; and end fences connecting the pair of opposed side fences, and wherein at least one end fence is a pivoting end fence and the pivoting end fence is made up of two end sections that are pivotally connected to the ends of the opposed side fences to allow access to the enclosure.

2. The feed device of claim 1 wherein access bars are spaced apart from each other in a substantially parallel arrangement.

3. The feed device of claim 1 wherein each access grate has a first attachment member, a second attachment member and a plurality of attachment side members wherein the second attachment member is spaced away from the first attachment member by the attachment side members and wherein the access bars extend between the first attachment member and the second attachment member.

4. The feed device of claim 3 wherein the first attachment member and the second attachment member each have access bar locating holes placed along the respective first attachment member and second attachment member so that the ends of the access bars may be located in desired access bar locating holes to create the desired separation of the access bars.

5. The feed device of claim 1 wherein the at least one access grate comprises two access grates each connected to the means for supporting the access grate through a pivot to allow each access grate to either move into contact with animal feed or allow animal feed to move into contact with an access grate.

6. The feed device of claim 1 further comprising a latch that locks the end sections together so that they form a closed pivoting end fence.

7. The feed device of claim 6 wherein each end section has an ultimate edge and wherein the latch is located near the ultimate edges of the end sections and wherein the latch comprises: a pair of parallel reinforcing strips that run at least in part across the end sections; a pivoting bar having a longitudinal axis wherein the pivoting bar extends substantially vertically near the ultimate edge of either end section between the two parallel reinforcing strips; at least one hinge that connects the pivoting bar to the reinforcing strips so that the pivoting bar rotates about its longitudinal axis; a tang that extends away from the pivoting bar about midway along the pivoting bar; a tang slot formed in the ultimate edge of one of the end sections wherein the tang slot is dimensioned to snugly receive the tang as the ultimate edges of the end sections are brought close together and the pivoting bar rotated about its longitudinal axis; a leverage bar extending away from the pivoting bar approximately opposite the tang to move the pivoting bar about its longitudinal axis, the leverage bar having an ultimate end opposite the pivoting bar.

8. The feed device of claim 7 further comprising a securing mechanism located at the ultimate end of the leverage bar, the securing mechanism keeping the ultimate end of the leverage bar is a secure and locked relationship to the end section that the pivoting bar and leverage bar are attached.

9. The feed device of claim 1 wherein the pivot is located in a location chosen from the group consisting of on an opposed side fence or attached to a corner post so that the at least one access grate in a vertical configuration is substantially above a respective opposed side fence.

10. The feed device of claim 9 wherein each access grate is pivotally connected to a location chosen from the group consisting of an opposed side fence or corner post so that the at least one access grate is allowed to move from a substantially vertical configuration above or near an opposed side fence inwardly towards the enclosure to contact the feed within the enclosure.

11. The feed device of claim 1 further comprising a movement limiting device that controls movement of each access grate as the access grate pivots around its pivot in order to control the amount of feed that an animal or animals using the feed device are able to eat in any given time period.

12. The feed device of claim 11 wherein the movement limiting device is a ratchet that is connected to the access grate through a cable and allows the cable to be paid out in desirable increments to allow the access grate to move into contact with the feed within the enclosure.

13. A feed device for providing feed to animals comprising:
   structure forming an enclosure for containing animal feed, the structure having a plurality of corners;
   at least one access grate having a plurality of access bars spaced apart to allow an animal access to the feed contained within the enclosure, the access bars each having ends; and
   means for supporting the access grate through a pivot to allow the access grate to either move into contact with the animal feed or allow the animal feed to move into contact with the access grate, wherein the structure forming an enclosure comprises: a pair of opposed side fences; a corner post located at each corner of the feed device; and end fences connecting the pair of opposed side fences, and wherein at least one end fence is a pivoting end fence and the pivoting end fence moves vertically up and down between respective corner posts attached to the ends of the opposed side fences.

14. A feed device for providing feed to animals comprising:
   structure forming an enclosure for containing animal feed, the structure having a plurality of corners;
   at least one access grate having a plurality of access bars spaced apart to allow an animal access to the feed contained within the enclosure, the access bars each having ends; and
   means for supporting the access grate through a pivot to allow the access grate to either move into contact with the animal feed or allow the animal feed to move into contact with the access grate, wherein the structure forming an enclosure comprises: a pair of opposed side fences; a corner post located at each corner of the feed device; and end fences connecting the pair of opposed side fences, and wherein at least one end fence is a pivoting end fence and the pivoting end fence pivots around a location chosen from the group consisting of along an axis parallel to and located close to the ground or an axis located parallel to and a distance above the ground to allow access to the enclosure whereafter the pivoting end fence then pivots back into a substantially vertical orientation to close the enclosure.

15. A feed device for providing feed to animals comprising:
   structure forming an enclosure for containing animal feed, the structure having a plurality of corners;
   at least one access grate having a plurality of access bars spaced apart to allow an animal access to the feed contained within the enclosure, the access bars each having ends;
   means for supporting the access grate through a pivot to allow the access grate to either move into contact with the animal feed or allow the animal feed to move into contact with the access grate, wherein the structure forming an enclosure comprises: a pair of opposed side fences; a corner post located at each corner of the feed device; and end fences connecting the pair of opposed side fences, and the feed device further comprising a movement limiting device located on a corner post that controls movement of each access grate as the access grate pivots around its pivot in order to control the amount of feed that an animal or animals using the feed device are able to eat in any given time period.

16. A feed device for providing feed to animals comprising:
   structure forming an enclosure for containing animal feed;
   at least one access grate having a plurality of access bars spaced apart to allow an animal access to the feed contained within the enclosure, the access bars each having ends; and
   means for supporting the access grate through a pivot to allow the access grate to either move into contact with the animal feed or allow the animal feed to move into contact with the access grate, wherein the enclosure is formed by a box that holds the feed within the enclosure, the box having a front side and a back side and an opening at the front side.

17. The feed device of claim 16 wherein the box has a floor, a top wall and a pair of sides and wherein the enclosure is formed between the floor, top wall and pair of sides, the floor has a lip that extends upward at the back side of the floor at an angle preferably of about 90° to the plane of the main body of the floor to retain feed in the box and keep the feed from sliding downward out of the box along the floor, the back side has an opening and further comprising a back wall pivotally attached to the lip so that the back wall pivots out of the way to allow feed to be placed through the opening at the back side, and wherein the back side has an opening and further comprising a back wall pivotally attached to the lip so that the back wall pivots out of the way to allow feed to be placed through the opening at the back side.

18. The feed device of claim 17 wherein the back wall is attached to one or more sides through at least one hinge connecting the back wall to one or more sides.

19. The feed device of claim 17 wherein the back wall comprises two sections with each section attached to a respective side through a hinge so that the opening is accessed when the back wall is rotated around the hinge.

20. The feed device of claim 17 wherein the top wall is attached to the sides by a pivot to allow the top wall to rotate up to allow feed to be placed in the box from the back side and then allow the top wall to rotate down to rest on the feed.

* * * * *